United States Patent
Lim et al.

(10) Patent No.: US 11,379,175 B2
(45) Date of Patent: Jul. 5, 2022

(54) DISPLAY APPARATUS AND CONTROL METHOD THEREOF

(71) Applicant: SAMSUNG ELECTRONICS CO., LTD., Suwon-si (KR)

(72) Inventors: Sungmin Lim, Suwon-si (KR); Taehoon Lee, Suwon-si (KR); Hanjin Park, Suwon-si (KR); Changwon Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 10 days.

(21) Appl. No.: 16/588,354

(22) Filed: Sep. 30, 2019

(65) Prior Publication Data

US 2020/0293255 A1     Sep. 17, 2020

(30) Foreign Application Priority Data

Mar. 11, 2019  (KR) .................. 10-2019-0027438
Sep. 6, 2019   (KR) .................. 10-2019-0111015

(51) Int. Cl.
  *G06F 3/147*    (2006.01)
  *G09G 5/373*   (2006.01)
  *G09G 5/38*    (2006.01)

(52) U.S. Cl.
  CPC ............. *G06F 3/147* (2013.01); *G09G 5/373* (2013.01); *G09G 5/38* (2013.01); *G09G 2340/045* (2013.01); *G09G 2340/0492* (2013.01); *G09G 2354/00* (2013.01)

(58) Field of Classification Search
  None
  See application file for complete search history.

(56) References Cited

U.S. PATENT DOCUMENTS

| | | | |
|---|---|---|---|
| 5,134,390 A | 7/1992 | Kishimoto et al. | |
| 8,909,300 B2 | 12/2014 | Senoo | |
| 9,049,397 B2 * | 6/2015 | Ikenoue | G06K 9/00241 |
| 9,280,804 B2 | 3/2016 | Krishnaswamy et al. | |

(Continued)

FOREIGN PATENT DOCUMENTS

| | | |
|---|---|---|
| EP | 3444798 A1 | 2/2019 |
| JP | 4356368 B2 | 11/2009 |

(Continued)

OTHER PUBLICATIONS

Ha, KR 20090021628 A with English translation, 2009.*

(Continued)

*Primary Examiner* — Sultana M Zalalee
(74) *Attorney, Agent, or Firm* — Sughrue Mion, PLLC

(57) ABSTRACT

A display apparatus and a control method thereof are provided. The display apparatus includes: a display, a driver configured to rotate the display between a horizontal arrangement state in which a width of the display is greater than a height of the display, and a vertical arrangement state in which the height of the display is greater than the width of the display; and a processor configured to execute instructions to: identify an object included in an image, identify whether the image is an image of a horizontal type or an image of a vertical type based on the identified object, and based on an arrangement state of the display and the identified type of the image, control the driver to rotate the display.

14 Claims, 19 Drawing Sheets

(56) References Cited

U.S. PATENT DOCUMENTS

| | | | |
|---|---|---|---|
| 9,508,123 B2 | 11/2016 | Kwon et al. | |
| 10,417,781 B1* | 9/2019 | Konolige | G06N 3/08 |
| 10,445,050 B2 | 10/2019 | Park et al. | |
| 2005/0104848 A1* | 5/2005 | Yamaguchi | G06F 1/1632 |
| | | | 345/156 |
| 2006/0165264 A1* | 7/2006 | Saitoh | G06V 10/50 |
| | | | 382/115 |
| 2009/0161949 A1* | 6/2009 | Milov | G06F 11/3664 |
| | | | 382/162 |
| 2009/0237680 A1* | 9/2009 | Usui | G06K 9/00228 |
| | | | 358/1.2 |
| 2010/0157129 A1* | 6/2010 | Lee | H04N 5/232945 |
| | | | 348/333.04 |
| 2011/0242354 A1* | 10/2011 | Matsumoto | H04N 5/23238 |
| | | | 348/222.1 |
| 2011/0254691 A1* | 10/2011 | Ooi | H04N 5/232411 |
| | | | 340/635 |
| 2011/0312376 A1* | 12/2011 | Woo | H04M 1/27457 |
| | | | 455/556.1 |
| 2013/0234927 A1* | 9/2013 | Roh | G06F 3/011 |
| | | | 345/156 |
| 2013/0258117 A1* | 10/2013 | Penov | G06K 9/2081 |
| | | | 348/207.1 |
| 2013/0293456 A1* | 11/2013 | Son | G06F 3/012 |
| | | | 345/156 |
| 2014/0140609 A1 | 5/2014 | Krishnaswamy et al. | |
| 2014/0168271 A1* | 6/2014 | Yu | G06T 3/60 |
| | | | 345/652 |
| 2014/0233801 A1* | 8/2014 | Cho | G06T 7/20 |
| | | | 382/103 |
| 2014/0333671 A1 | 11/2014 | Phang et al. | |
| 2015/0029318 A1 | 1/2015 | Cho | |
| 2015/0030259 A1 | 1/2015 | Kwon et al. | |
| 2015/0070390 A1* | 3/2015 | Kasahara | G06K 9/00671 |
| | | | 345/633 |
| 2015/0310300 A1* | 10/2015 | Hou | G06Q 30/0631 |
| | | | 705/26.7 |
| 2015/0341563 A1 | 11/2015 | Choi et al. | |
| 2016/0147792 A1* | 5/2016 | Oh | G06F 21/30 |
| | | | 707/723 |
| 2017/0199575 A1* | 7/2017 | Baldwin | H04N 5/33 |
| 2017/0345389 A1* | 11/2017 | Funada | H04N 9/3194 |
| 2018/0018946 A1* | 1/2018 | Park | G06F 3/0346 |
| 2018/0060015 A1 | 3/2018 | Park et al. | |
| 2018/0131869 A1* | 5/2018 | Kim | H04N 5/232127 |
| 2018/0267993 A1* | 9/2018 | Lee | G06F 16/434 |
| 2019/0034759 A1* | 1/2019 | Barnett | G06K 9/6202 |
| 2019/0050964 A1 | 2/2019 | Jang et al. | |
| 2019/0333479 A1* | 10/2019 | Maalouf | G09G 5/38 |
| 2019/0361590 A1* | 11/2019 | Chan | G06F 3/0481 |
| 2020/0050878 A1* | 2/2020 | Badr | G06K 9/6262 |

FOREIGN PATENT DOCUMENTS

| | | |
|---|---|---|
| JP | 5805503 B2 | 11/2015 |
| KR | 10-0654845 B1 | 12/2006 |
| KR | 1020090021628 A | 3/2009 |
| KR | 10-2011-0038559 A | 4/2011 |
| KR | 10-2011-0117490 A | 10/2011 |
| KR | 1020110122557 A | 11/2011 |
| KR | 10-1096051 B1 | 12/2011 |
| KR | 10-1392931 B1 | 5/2014 |
| KR | 10-2015-0008951 A | 1/2015 |
| KR | 10-2015-0011714 A | 2/2015 |
| KR | 10-2015-0070363 A | 6/2015 |
| KR | 10-1677658 B1 | 11/2016 |
| KR | 10-2018-0024501 A | 3/2018 |
| KR | 10-2019-0017614 A | 2/2019 |

OTHER PUBLICATIONS

Communication dated Jul. 15, 2020, from the European Patent Office in counterpart European Application No. 19200587.4.
Communication dated Aug. 22, 2020, issued by the Korean Intellectual Property Office in corresponding Korean Application No. 10-2019-0111015.
Written Opinion (PCT/ISA/237) issued by the International Searching Authority in corresponding International Application No. PCT/KR2019/012703, dated Jan. 17, 2020.
International Search Report (PCT/ISA/210), issued by International Searching Authority in corresponding International Application No. PCT/KR2019/012703, dated Jan. 17, 2020.
Communication dated Apr. 14, 2020 from the European Patent Office in application No. 19200587.4.
Communication dated Feb. 9, 2021 by the Korean Intellectual Property Office in corresponding Korean Application No. 10-2019-0111015.
Communication dated Oct. 18, 2021, from the European Patent Office in European Application No. 19200587.4.
Communication dated Mar. 24, 2022, issued by the India Intellectual Property Office in Indian Patent Application No. 202117045234.

* cited by examiner

| Image Information | |
|---|---|
| date | May 30, 2018 |
| format | MP4 |
| resolution | 1920 × 1080 |
| size | 128MB |

DISPLAY APPARATUS AND CONTROL METHOD THEREOF

CROSS-REFERENCE TO RELATED APPLICATION(S)

This application is based on and claims priority under 35 U.S.C. § 119 to Korean Patent Application No. 10-2019-0027438, filed on Mar. 11, 2019, in the Korean Intellectual Property Office and Korean Patent Application No. 10-2019-0111015, filed on Sep. 6, 2019, in the Korean Intellectual Property Office, the disclosure of which is incorporated by reference herein in its entirety.

BACKGROUND

1. Field

The disclosure relates to a display apparatus and a control method thereof, and more particularly, to a display apparatus that is capable of rotating a display and a control method thereof.

2. Description of Related Art

In general, a display apparatus such as a television (TV) displays an image based on resolution information of the image. For example, if the resolution of an image is 1920×1080, a display apparatus displays the image of which width is longer than the height.

However, an actual image may not be an image of a horizontal type, i.e., in which the aspect ratio consists of a greater width than height. For example, a case wherein a user rotates an image photographed in a resolution of 1080×1920, so as to have a resolution of 1920×1080, and stores (or uploads to a server, etc.) the rotated image falls under this case.

In this case, as illustrated in FIG. 1, a display apparatus displays an image of a vertical type (i.e., of which height is greater than width) as a horizontal image.

As a result, a user's viewing of the image is interfered with, such that there is a need to display an image of a vertical type as a vertical image of which height is greater than the width. Likewise, there is a need to display an image of a horizontal type as a horizontal image of which width is greater than the height.

SUMMARY

Provided are a display apparatus which, in case resolution information of an image and the actual type of the image do not correspond to each other, rotates a display to correspond to the actual type of the image, and a control method thereof.

Additional aspects will be set forth in part in the description which follows and, in part, will be apparent from the description, or may be learned by practice of the presented embodiments.

In accordance with an aspect of the disclosure, a display apparatus includes: a display; a driver configured to rotate the display between a horizontal arrangement state in which a width of the display is greater than a height of the display, and a vertical arrangement state in which the height of the display is greater than the width of the display; and a processor configured to execute instructions to: identify an object included in an image, identify whether the image is an image of a horizontal type or an image of a vertical type based on the identified object, and based on an arrangement state of the display and the identified type of the image, control the driver to rotate the display.

The processor may be further configured to execute the instructions to: identify a direction of the object included in the image; based on a width of the image being greater than a height of the image according to the direction of the object, identify the image as the image of the horizontal type; and based on the height of the image being greater than the width according to the direction of the object, identify the image as the image of the vertical type.

The object may include at least one of a text, a thing, or a person included in the image.

The processor may be further configured to execute the instructions to: based on a direction of the text and a direction of the thing included in the image being different from each other, identify a type of the image according to the direction of the text; and based on the direction of the thing and a direction of the person included in the image being different from each other, identify the type of the image according to the direction of the thing.

The processor may be further configured to execute the instructions to: based on the display being arranged in the vertical arrangement state, and based on identifying the image as the image of the horizontal type, control the driver to rotate the display to the horizontal arrangement state; and based on the display being arranged in the horizontal arrangement state, and based on identifying the image as the image of the vertical type, control the driver to rotate the display to the vertical arrangement state.

The processor may be further configured to execute the instructions to: control to display a user interface (UI) item selectable for rotation of the display; and based on a selection of the UI item being received, control the driver to rotate the display.

The processor may be further configured to execute the instructions to: determine whether a blank area is included in the image; and based on determining that the blank area is included in the displayed image, crop the image to exclude the blank area, and identify the object in the cropped image.

The processor may be further configured to execute the instructions to: based on a user instruction for displaying the image being received, control to display the image on the display; and identify whether the image is the image of the horizontal type or the image of the vertical type based on the object identified for a predetermined time period after the image is displayed on the display.

The processor may be further configured to execute the instructions to, based on the object identified for the predetermined time period being displayed in a plurality of directions, identify a type of the image according to the direction in which the object is displayed for a relatively longest period of time.

The processor may be further configured to execute the instructions to: determine a direction for rotating the display by a minimum rotation angle; and control the driver to rotate the display in the determined direction.

In accordance with another aspect of the disclosure, a control method of a display apparatus, includes: identifying an object included in an image; identifying whether the image is an image of a horizontal type or an image of a vertical type based on the identified object; and based on an arrangement state of a display of the display apparatus and the identified type of the displayed image, rotating the display, wherein the display is rotatable between a horizontal arrangement state in which a width of the display is greater than a height of the display, and a vertical arrangement state in which the height of the display is greater than the width of the display.

The identifying may include: identifying a direction of the object included in the image; based on a width of the image being greater than a height of the image according to the direction of the object, identifying the image as the image of the horizontal type; and based on the height of the image being greater than the width of the image according to the direction of the object, identifying the image as the image of the vertical type.

The object may include at least one of a text, a thing, or a person included in the image.

The identifying may include: based on a direction of the text and a direction of the thing included in the image being different from each other, identifying a type of the image according to the direction of the text; and based on the direction of the thing and a direction of the person included in the image being different from each other, identifying the type of the image according to the direction of the thing.

The rotating may include: based on the display being arranged in the vertical arrangement state, and based on identifying the image as the image of the horizontal type, rotating the display to the horizontal arrangement state; and based on the display being arranged in the horizontal arrangement state, and based on identifying the image as the image of the vertical type, rotating the display to the vertical arrangement state.

The control method may further include: displaying a user interface (UI) item selectable for rotation of the display, wherein the rotating may include, based on a selection of the UI item being received, rotating the display.

The identifying the object may include: determining whether a blank area is included in the image; and based on determining that the blank area is included in the displayed image, cropping the image to exclude the blank area, and identifying the object in the cropped image.

The identifying may include: based on a user instruction for displaying the image being received, displaying the image on the display; and identifying whether the image is the image of the horizontal type or the image of the vertical type based on the object identified for a predetermined time period after the image is displayed on the display.

The identifying may include, based on the object identified for the predetermined time period being displayed in a plurality of directions, identifying a type of the image based on the direction in which the object is displayed for a relatively longest period of time.

The rotating may include: determining a direction for rotating the display by a minimum rotation angle; and rotating the display in the determined direction.

In accordance with another aspect of the disclosure, a display apparatus includes: a memory storing instructions; and a processor configured to execute the instructions to: identify an object included in an image, identify whether the image is an image of a horizontal type or an image of a vertical type based on the identified object, and based on an arrangement state of the display and the identified type of the image, determine to rotate a display that is rotatable between a horizontal arrangement state in which a width of the display is greater than a height of the display, and a vertical arrangement state in which the height of the display is greater than the width of the display.

The processor may be further configured to execute the instructions to: identify a direction of the object included in the image; based on a width of the image being greater than a height of the image according to the direction of the object, identify the image as the image of the horizontal type; and based on the height of the image being greater than the width according to the direction of the object, identify the image as the image of the vertical type.

The object may include at least one of a text, a thing, or a person included in the image; and wherein the processor may be further configured to execute the instructions to: based on a direction of the text and a direction of the thing included in the image being different from each other, identify a type of the image according to the direction of the text; and based on the direction of the thing and a direction of the person included in the image being different from each other, identify the type of the image according to the direction of the thing.

The processor may be further configured to execute the instructions to: based on the display being arranged in the vertical arrangement state, and based on identifying the image as the image of the horizontal type, determine to rotate the display to the horizontal arrangement state; and based on the display being arranged in the horizontal arrangement state, and based on identifying the image as the image of the vertical type, determine to rotate the display to the vertical arrangement state.

The processor may be further configured to execute the instructions to: control to display a user interface (UI) item selectable for rotation of the display; and based on a selection of the UI item being received, determine to rotate the display.

The processor may be further configured to execute the instructions to: determine whether a blank area is included in the image; and based on determining that the blank area is included in the displayed image, crop the image to exclude the blank area, and identify the object in the cropped image.

The processor may be further configured to execute the instructions to: based on a user instruction for displaying the image being received, control to display the image on the display; and identify whether the image is the image of the horizontal type or the image of the vertical type based on the object identified for a predetermined time period after the image is displayed on the display.

The processor may be further configured to execute the instructions to, based on the object identified for the predetermined time period being displayed in a plurality of directions, identify a type of the image according to the direction in which the object is displayed for a relatively longest period of time.

The processor may be further configured to execute the instructions to: determine a direction for rotating the display by a minimum rotation angle; and determine to rotate the display in the determined direction.

In accordance with another aspect of the disclosure, a non-transitory computer-readable recording medium has recorded thereon instructions executable by at least one processor to perform the control method.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

First, terms in this specification and the claims are used in consideration of the functions, operations, and structures described in the disclosure. However, the terms may vary depending on an intention of those skilled in the art, legal or technical interpretation, or emergence of new technologies. Also, some terms may be designated or defined by the applicant on his own, and in such cases, the meaning of the terms may be interpreted based on a definition or context provided in this specification. Meanwhile, if there is no specific definition of the terms, the meaning of the terms may be interpreted based on the overall content of this specification and technical knowledge common in the pertinent technical field.

It is understood that, hereinafter, expressions such as "at least one of," when preceding a list of elements (e.g., "at least one of A and B" or "at least one of A or B"), modify the entire list of elements (i.e., only A, only B, or both A and B) and do not modify the individual elements of the list.

Also, in case it is determined that in describing embodiments, detailed explanation of related known functions or configurations may unnecessarily confuse the gist of the disclosure, the detailed explanation will be abridged or omitted.

Further, while one or more embodiments will be described in detail below with reference to the following accompanying drawings and the content described in the accompanying drawings, it is not intended that the disclosure is restricted or limited by these embodiments.

Hereinafter, a display arranged in a vertical direction (whereby a height of the display is greater than the width of the display) may be referred to as a display in a portrait posture, a display in a vertical direction posture, or a display in a vertical mode. Further, and a display in a horizontal direction (whereby a width of the display is greater than a height of the display) may be referred to as a display in a landscape posture, a display in a horizontal direction posture, or a display in a horizontal mode.

Hereinafter, one or more embodiments will be described in detail with reference to the accompanying drawings.

Figure 1:
FIG. 1 is a diagram for illustrating an embodiment wherein a related art display apparatus displays an image of a vertical type.
Figure 2:
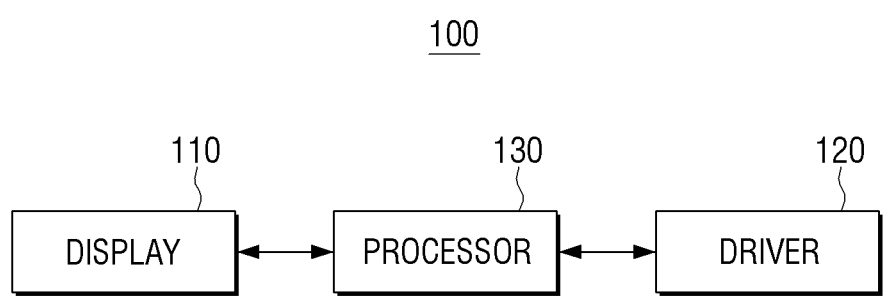
FIG. 2 is a block diagram for illustrating a display apparatus according to an embodiment.

FIG. 2 is a block diagram for illustrating a display apparatus 100 according to an embodiment.

The display apparatus 100 according to an embodiment may be a smart TV. However, this is merely an example, and the display apparatus 100 may be various electronic apparatuses equipped with a display such as a computer, a laptop computer, a tablet, a digital camera, a camcorder, a personal digital assistant (PDA), a mobile display device, a smartphone, etc.

Referring to FIG. 2, the display apparatus 100 according to an embodiment includes a display 110, a driver 120, and at least one processor 130.

The display 110 may display various screens. As an example, the display 110 may not only display a pre-stored image, but also display an image received from an external apparatus. Here, an external apparatus may be various electronic apparatuses that can transmit an image to the display apparatus 100 such as a server, a computer, a laptop computer, a smartphone, etc.

Meanwhile, an image may include at least one of a still image or a moving image, and the display 110 may display various images such as a broadcasting content, a multimedia content, etc. Also, the display 110 may display various kinds of user interfaces (UIs) and icons.

The display 110 may be rotated. Specifically, the display 110 may be arranged in one of a horizontal type or a vertical type, according to a control signal for rotation. For this, the disclosure may further include a driver 120 for rotating the display 110.

The display 110 as described above may be implemented as displays in various forms such as a liquid crystal display (LCD) panel, a light emitting diode (LED) display or backlit display, an organic light emitting diodes (OLED) display, a liquid crystal on silicon (LCoS) display, a digital light processing (DLP) display, etc. Also, inside the display 110, driving circuits that may be implemented in forms such as an a-Si thin-film-transistor (TFT), a low temperature poly silicon (LTPS) TFT, an organic TFT (OTFT), etc., a backlight unit, etc., may also be included.

In addition, the display 110 may be combined with a touch detector, and implemented as a touch screen.

The driver 120 may rotate the display 110. Specifically, according to a control signal for rotation, the driver 120 may rotate the display 110 so as to be one of a horizontal type (in which width is greater than height) or a vertical type (in which height is greater than width). Here, the direction of rotation may not only be a clockwise direction, but also a counterclockwise direction. For this, the driver 120 may include a motor.

The processor 130 controls the overall operations of the display apparatus 100. For this, the processor 130 may include one or more of a central processing unit (CPU), an application processor (AP), and a communication processor (CP).

The processor 130 may operate (e.g., execute) an operating system and/or an application program, control the hardware or software components connected to the processor 130, and perform various types of data processing and operations. Also, the processor 130 may load an instruction or data received from at least one of other components on a volatile memory and process the received instruction or data, and store various data in a non-volatile memory.

The processor 130 may control the display 110 to display an image. Here, an image may be at least one of a still image or a moving image that is pre-stored, captured, or received from an external apparatus.

For example, if a user instruction for displaying a pre-stored still image or a pre-stored moving image is received, the processor 130 may control the display 110 to display the image. To this end, the display apparatus 100 may further include a storage for storing images.

Also, if a user instruction for reproducing a specific moving image is received through a moving image application, the processor 130 may transmit a signal requesting transmission of the moving image to an external apparatus (e.g., a server). Then, when a moving image is received from the external apparatus, the processor 130 may control the display 110 to display the received moving image. For this, the display apparatus 100 may further include a communicator for communicating with an external apparatus.

While an image is displayed on the display 110, the processor 130 may identify an object included in the image. Here, an object may be at least one of a text, a thing, or a person included in the image displayed on the display 110.

Specifically, while an image is displayed on the display 110, the processor 130 may identify at least one of a text (e.g., a word, a character, or a number, etc.), a thing, or a person included in the image through an image recognition algorithm.

Here, an image recognition algorithm may be at least one of a character recognition algorithm, an object recognition algorithm, or a face recognition algorithm. For example, the processor 130 may detect a contour line of an object included in an image through a character recognition algorithm, and identify a text included in the image therefrom. Also, the processor 130 may detect a contour line of an object included in an image through an object recognition algorithm, and identify a text included in the image therefrom. In addition, by detecting at least one of skin tone or color, eyes, a nose, or a mouth included in the image through a facial recognition algorithm, the processor 130 may identify a person included in the image.

Meanwhile, the aforementioned algorithms are merely examples, and the disclosure may identify a text, a thing (e.g., inanimate object), and/or a person included in an image through various algorithms such as an algorithm identifying an object through analysis of color values of an image, an algorithm identifying an object through analysis of patterns of an object included in an image, etc.

Also, the processor 130 may identify an object included in an image through an artificial intelligence model. Here, an artificial intelligence model may be a model based on machine learning or a deep neural network (DNN). However, this is merely an example, and an artificial intelligence model may be various models such as a convolution neural network (CNN), a recurrent neural network (RNN), a bidirectional recurrent deep neural network (BRDNN), etc.

If an object is identified, the processor 130 may identify whether the image displayed on the display 110 is an image of a horizontal type or an image of a vertical type, based on the identified object.

Specifically, the processor 130 may identify the direction of the identified object, and if the width of the image displayed on the display 110 is longer than the height based on the direction of the object, the processor 130 may identify the image displayed on the display 110 as an image of a horizontal type, and if the height of the image displayed on the display 110 is longer than the width based on the direction of the object, the processor 130 may identify the image displayed on the display 110 as an image of a vertical type.

Hereinafter, description will be made with reference to FIGS. 3A, 3B, 4A, and 4B.

Figure 3A:
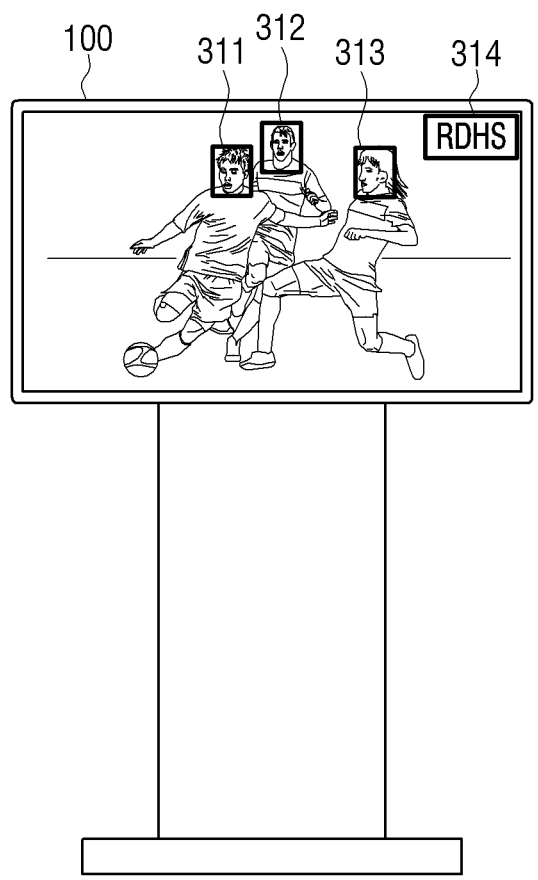
FIG. 3A is a diagram for illustrating an embodiment wherein an image of a horizontal type is displayed on a display arranged in a horizontal direction.
Figure 3B:
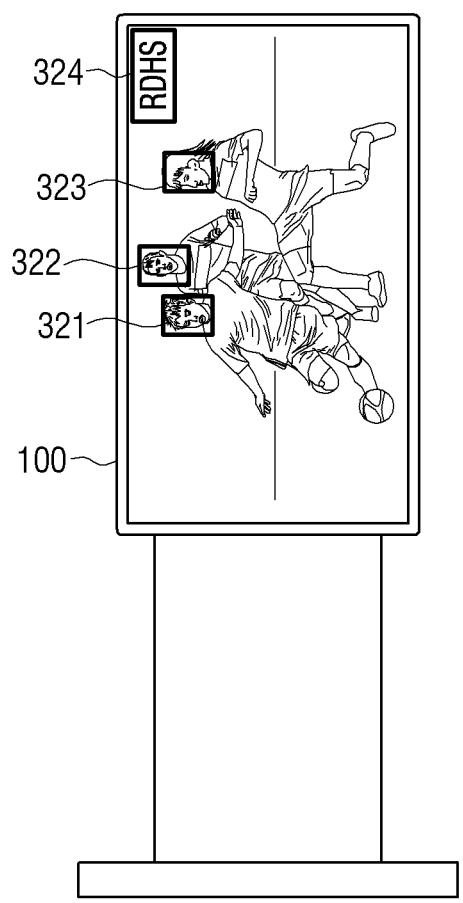
FIG. 3B is a diagram for illustrating an embodiment wherein an image of a horizontal type is displayed on a display arranged in a vertical direction.

FIG. 3A is a diagram for illustrating an embodiment wherein an image of a horizontal type is displayed on a display 110 arranged in a horizontal direction, and FIG. 3B is a diagram for illustrating an embodiment wherein an image of a horizontal type is displayed on a display 110 arranged in a vertical direction.

As described above, the processor 130 may identify an object included in an image by using at least one of an image recognition algorithm or an artificial intelligence model.

For example, in case an image is displayed on the display 110 arranged in a horizontal direction as in FIG. 3A (landscape posture), the processor 130 may identify at least one of a face 311 to 313 or text 314 included in the image by using at least one of an image recognition algorithm or an artificial intelligence model. Referring to FIG. 3A, a text may be a broadcasting logo, but is not limited thereto. For example, the text may include close captioning data, text in an image object, etc.

Likewise, in case an image is displayed on the display 110 arranged in a vertical direction as in FIG. 3B (portrait posture), the processor 130 may also identify at least one of a face 321 to 323 or text 324 included in the image by using at least one of an image recognition algorithm or an artificial intelligence model.

Also, the processor 130 may identify the direction of the identified object. Specifically, if it is determined that an object is not rotated or is rotated in a clockwise direction or a counterclockwise direction at an angle in a predetermined first range (e.g., 1° to 20° based on a virtual y axis, the processor 130 may identify the direction of the object as a horizontal direction. Also, if it is determined that an object is rotated in a clockwise direction or a counterclockwise direction at an angle in a predetermined second range (e.g., 70° to 110° based on a virtual y axis, the processor 130 may identify the direction of the object as a vertical direction.

For example, referring to FIG. 3A, the processor 130 may identify a text 314 that is an object not rotated based on a virtual y axis as an object in a horizontal direction. Also, the processor 130 may identify the face 311 to 313 of a person that is an object not rotated or rotated in a clockwise direction or a counterclockwise direction at an angle of 1° to 20° which is an angle in a predetermined first range based on a virtual y axis as an object in a horizontal direction.

As another example, referring to FIG. 3B, the processor 130 may identify a text 324 that is an object rotated in a counterclockwise direction at an angle of 90° which is an angle in a predetermined second range based on a virtual y axis as an object in a vertical direction. Also, the processor 130 may identify the face 321 to 323 of a person that is an object rotated in a counterclockwise direction at an angle of 70° to 110° which is an angle in a predetermined second range based on a virtual y axis as an object in a vertical direction.

Accordingly, the processor 130 may identify the type of the image displayed on the display 110 based on the direction of the object.

Specifically, if the direction of the object is a horizontal direction, the processor 130 may identify the type of the image displayed on the display 110 based on a horizontal direction, and if the direction of the object is a vertical direction, the processor 130 may identify the type of the image displayed on the display 110 based on a vertical direction.

For example, if it is determined that an object in a horizontal direction is displayed on the display 110 as in FIG. 3A, the processor 130 identifies the type of the image displayed on the display 110 based on a horizontal direction. In this case, the width of the image is longer (greater) than the height of the image based on a horizontal direction (here, a virtual y axis is deemed as the width), and thus the processor 130 may identify the type of the image displayed on the display 110 as a horizontal type.

Meanwhile, if it is determined that an object in a vertical direction is displayed on the display 110 as in FIG. 3B, the processor 130 identifies the type of the image displayed on the display 110 based on a vertical direction. In this case, the width of the image is longer (greater) than the height of the image based on a vertical direction (i.e., a virtual y axis is deemed as the width), and thus the processor 130 may identify the type of the image displayed on the display 110 as a horizontal type.

That is, the type of an image is not determined based on the arrangement state of the display 110 itself, but based on the direction of an object. According to the present embodiment, regardless of whether the arrangement state of the display 110 is in a horizontal direction or in a vertical direction, the type of an image may be determined to be the same where the same image is displayed.

Figure 4A:
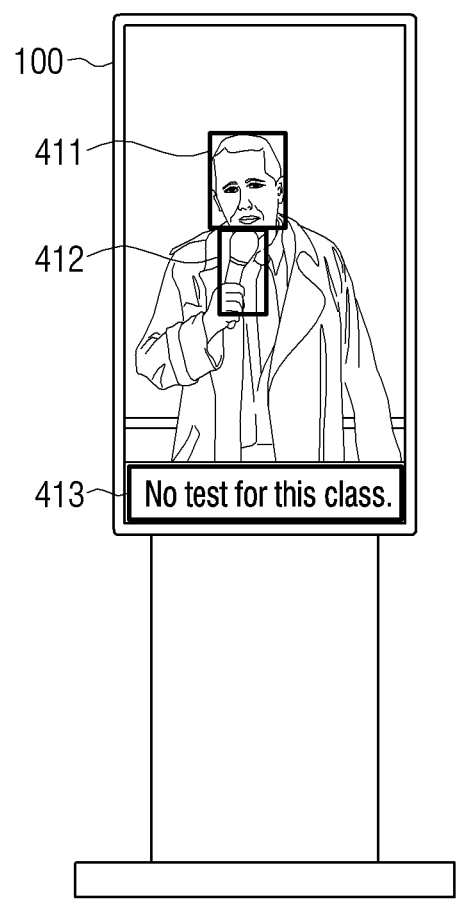
FIG. 4A is a diagram for illustrating an embodiment wherein an image of a vertical type is displayed on a display arranged in a vertical direction.
Figure 4B:
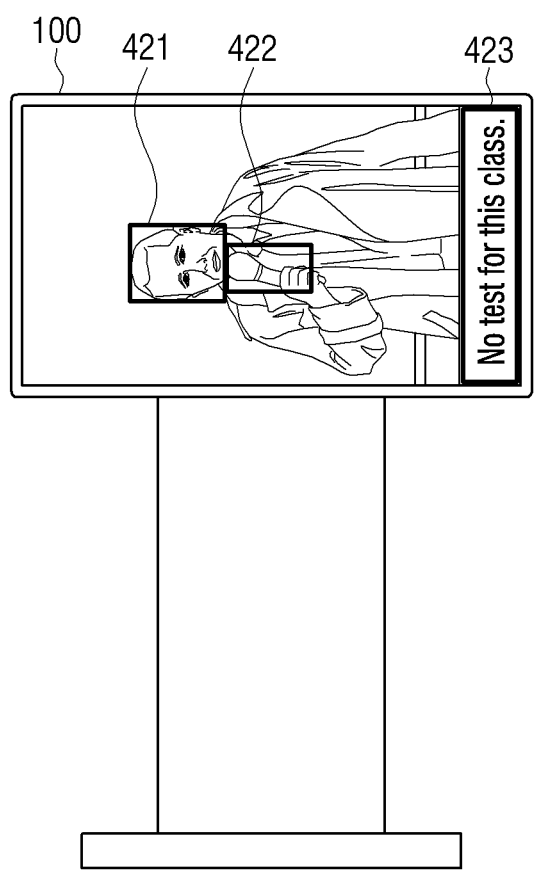
FIG. 4B is a diagram for illustrating an embodiment wherein an image of a vertical type is displayed on a display arranged in a horizontal direction.

FIG. 4A is a diagram for illustrating an embodiment wherein an image of a vertical type is displayed on a display 110 arranged in a vertical direction, and FIG. 4B is a diagram for illustrating an embodiment wherein an image of a vertical type is displayed on a display 110 arranged in a horizontal direction.

As described above, the processor 130 may identify an object included in an image by using at least one of an image recognition algorithm or an artificial intelligence model.

For example, in case an image is displayed on the display 110 arranged in a vertical direction as in FIG. 4A, the processor 130 may identify at least one of a face 411 of a person, a thing 412, or a text 413 included in the image by using at least one of an image recognition algorithm or an artificial intelligence model. Referring to FIG. 4A, a thing may be a microphone, and a text may be a subtitle, but are not necessarily limited thereto.

Likewise, in case an image is displayed on the display 110 arranged in a horizontal direction as in FIG. 4B, the processor 130 may identify at least one of a face 421 of a person, a thing 422, or a text 423 included in the image by using at least one of an image recognition algorithm or an artificial intelligence model.

Also, the processor 130 may identify the direction of the identified object. As described above, if it is determined that the object is not rotated or rotated (e.g., oriented) in a clockwise direction or a counterclockwise direction at an angle in a predetermined first range (e.g., 1° to 20° based on a virtual y axis, the processor 130 may identify the direction of the object as a horizontal direction. Meanwhile, if it is determined that an object is rotated in a clockwise direction or a counterclockwise direction at an angle in a predetermined second range (e.g., 70° to 110° based on a virtual y axis, the processor 130 may identify the direction of the object as a vertical direction.

For example, referring to FIG. 4A, the processor 130 may identify a text 413 that is an object not rotated based on a virtual y axis as an object in a horizontal direction. Also, the processor 130 may identify the face 411 of a person and a thing 412 that are objects rotated in a clockwise direction or a counterclockwise direction at an angle of 1° to 20° which is an angle in a predetermined first range based on a virtual y axis as objects in a horizontal direction.

As another example, referring to FIG. 4B, the processor 130 may identify a text 423 that is an object rotated in a counterclockwise direction at an angle of 90° which is an angle in a predetermined second range based on a virtual y axis as an object in a vertical direction. Also, the processor 130 may identify the face 421 of a person and a thing 423 that are objects rotated in a counterclockwise direction at an angle of 70° to 110° which is an angle in a predetermined second range based on a virtual y axis as objects in a vertical direction.

Accordingly, the processor 130 may identify the type of the image displayed on the display 110 based on the direction of an object.

As described above, if the direction of an object is a horizontal direction, the processor 130 may identify the type of the image displayed on the display 110 based on a horizontal direction, and if the direction of an object is a vertical direction, the processor 130 may determine the type of the image displayed on the display 110 based on a vertical direction.

For example, if it is determined that an object in a horizontal direction is displayed on the display 110 as in FIG. 4A, the processor 130 identifies the type of the image displayed on the display 110 based on a horizontal direction. In this case, the height of the image is longer (greater) than the width of the image based on a horizontal direction, and thus the processor 130 may identify the type of the image displayed on the display 110 as a vertical type.

Meanwhile, if it is determined that an object in a vertical direction is displayed on the display 110 as in FIG. 4B, the processor 130 identifies the type of the image displayed on the display 110 based on a vertical direction. In this case, the height of the image is longer (greater) than the width of the image based on a vertical direction, and thus the processor 130 may identify the type of the image displayed on the display 110 as a vertical type.

That is, in the present embodiment, the type of an image is not determined based on the arrangement state of the display 110 itself, but based on the direction of an object. Thus, regardless of whether the arrangement state of the display 110 is in a horizontal direction or in a vertical direction, the type of an image may be determined to be the same where the same image is displayed.

In the embodiment described above, the processor 130 identifies the type of the image based on the determined direction of the object and the corresponding width and height of the image according to the determined direction of the object. According to another embodiment, the processor 130 may identify the type of the image based on the direction of the object and the arrangement direction of the display 110. For example, based on the direction of the object being vertical and the arrangement direction of the display 110 being vertical (as in FIG. 3B), the processor 130 identifies the type of the displayed image as the horizontal type. Meanwhile, based on the direction of the object being horizontal and the arrangement direction of the display 110 being horizontal (as in FIG. 3A), the processor 130 also identifies the type of the displayed image as the horizontal type. Furthermore, based on the direction of the object being vertical and the arrangement direction of the display 110 being horizontal (as in FIG. 4B), the processor 130 identifies the type of the displayed image as the vertical type. Meanwhile, based on the direction of the object being horizontal and the arrangement direction of the display 110 being vertical (as in FIG. 4A), the processor 130 also identifies the type of the displayed image as the horizontal type.

Figure 5:
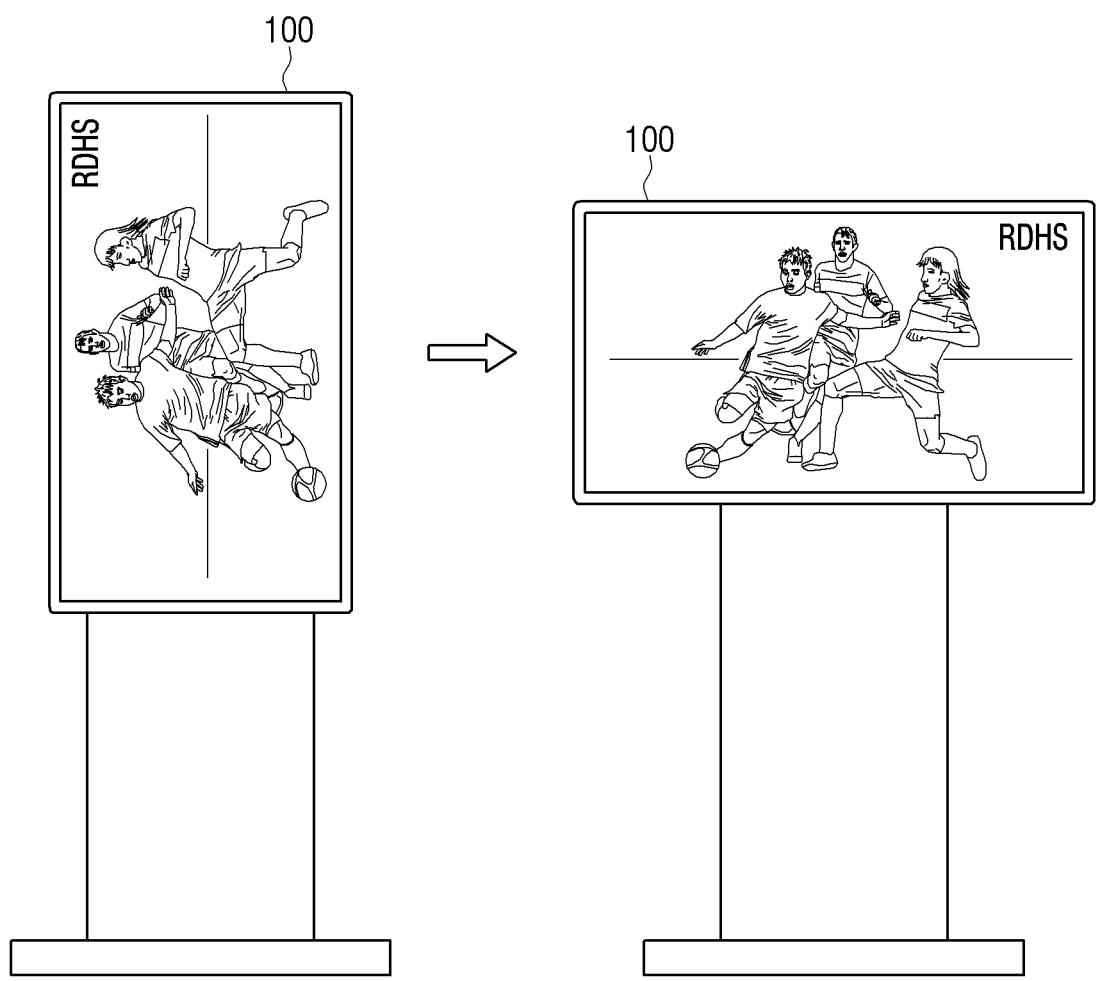
FIG. 5 is a diagram for illustrating an embodiment wherein a display arranged in a vertical direction is rotated.
Figure 6:
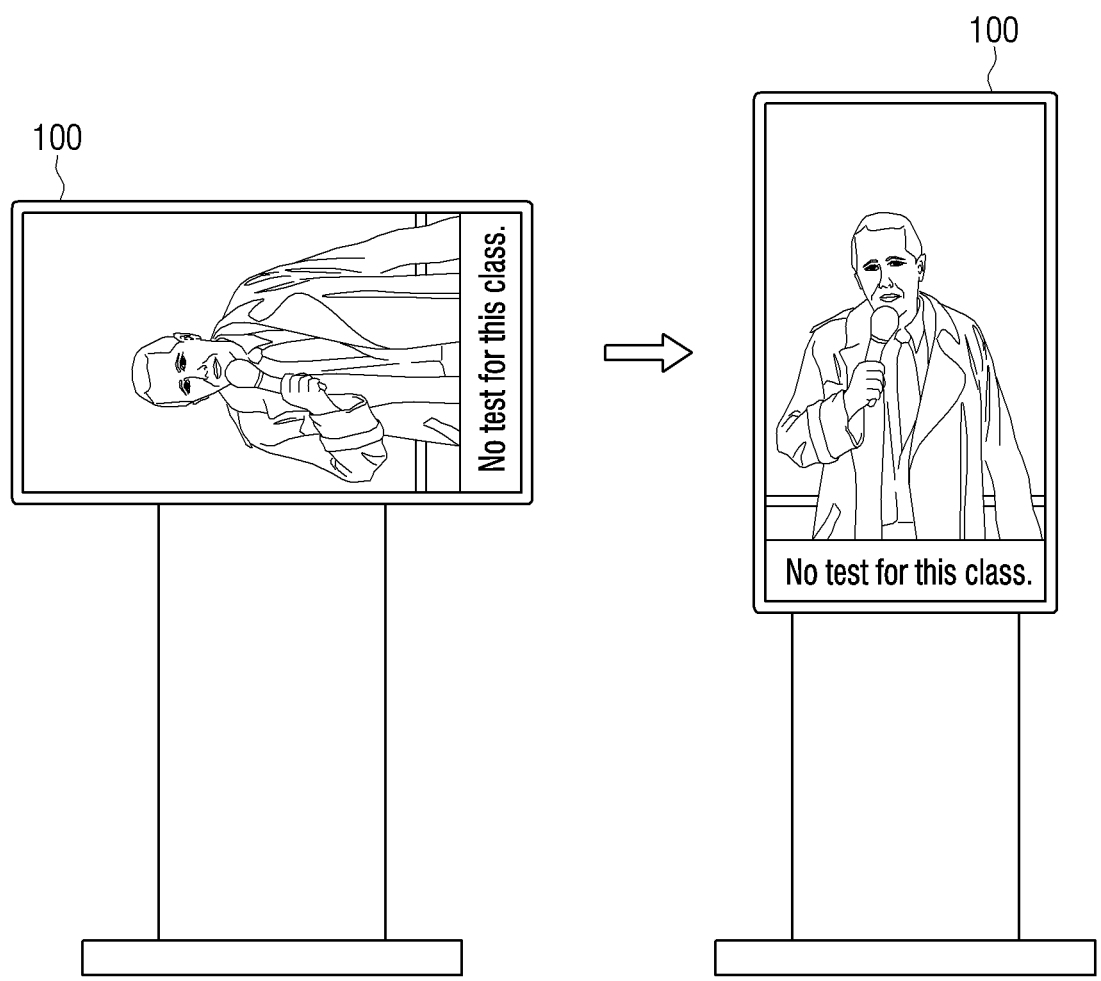
FIG. 6 is a diagram for illustrating an embodiment wherein a display arranged in a horizontal direction is rotated.

FIGS. 5 and 6 are diagrams for illustrating an embodiment wherein a display 110 is rotated.

When the type of an image is identified, the processor 130 may control the driver 120 to rotate the display 110, based on the arrangement state of the display 110 and the type (e.g., determined horizontal type or determined vertical type) of the image.

Specifically, if the arrangement state of the display 110 and the type of the image correspond to each other (e.g., determined to correspond to each other), the processor 130 may not rotate (i.e., control to rotate via, for example, a motor) the display 110. If the arrangement state of the display 110 and the type of the image do not correspond to each other (e.g., determined to not correspond to each other), the processor 130 may rotate (i.e., control to rotate via, for example, a motor) the display 110.

That is, while the display 110 is arranged in a vertical direction, if it is determined that an image of a horizontal type is displayed on the display 110, the processor 130 may control the driver 120 to rotate the display 110 in a horizontal direction. Similarly, while the display 110 is arranged in a horizontal direction, if it is determined that an image of a vertical type is displayed on the display 110, the processor 130 may control the driver 120 to rotate the display 110 in a vertical direction.

For example, in a state wherein the display 110 is arranged in a vertical direction as in FIG. 5, in case an image of a horizontal type is displayed on the display 110, the processor 130 may control the driver 120 to rotate the display 110 in a horizontal direction.

Alternatively, in a state wherein the display 110 is arranged in a horizontal direction as in FIG. 6, in case an image of a vertical type is displayed on the display 110, the processor 130 may control the driver 120 to rotate the display 110 in a vertical direction.

Accordingly, a user can enjoy a natural image.

Meanwhile, the processor 130 may determine a direction for rotating the display 110 by a minimum rotation angle, and control the driver 120 to rotate the display 110 in the determined direction.

Specifically, if it is determined that an object is rotated in a counterclockwise direction, the processor 130 may control the driver 120 to rotate the display 110 in a clockwise direction, and if it is determined that an object rotated in a clockwise direction, the processor 130 may control the driver 120 to rotate the display 110 in a counterclockwise direction.

For example, as illustrated in FIG. 5 or FIG. 6, in case an object is determined to be rotated in a counterclockwise direction, the processor 130 may control the driver 120 to rotate the display 110 in a clockwise direction at an angle of 90°, and in case an object is determined to be rotated in a clockwise direction, the processor 130 may control the driver 120 to rotate the display 110 in a counterclockwise direction at an angle of 90°.

Accordingly, the load on a motor may be reduced. According to another embodiment, the load on the motor can be reduced by only rotating the display 110 a maximum of 90° and then rotating the image 180° if the image is upside down.

Figure 7A:
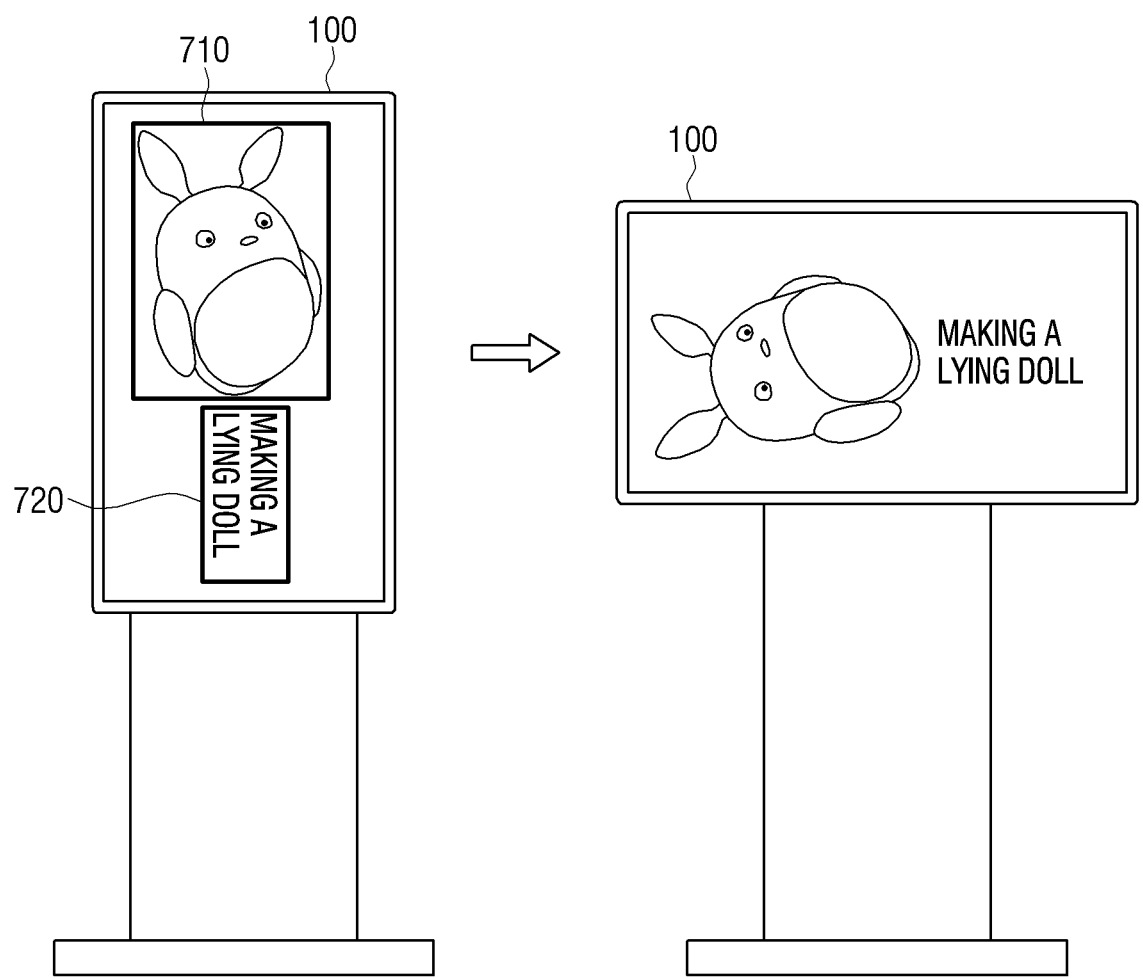
FIG. 7A is a diagram for illustrating an embodiment wherein the type of an image is determined.
Figure 7B:
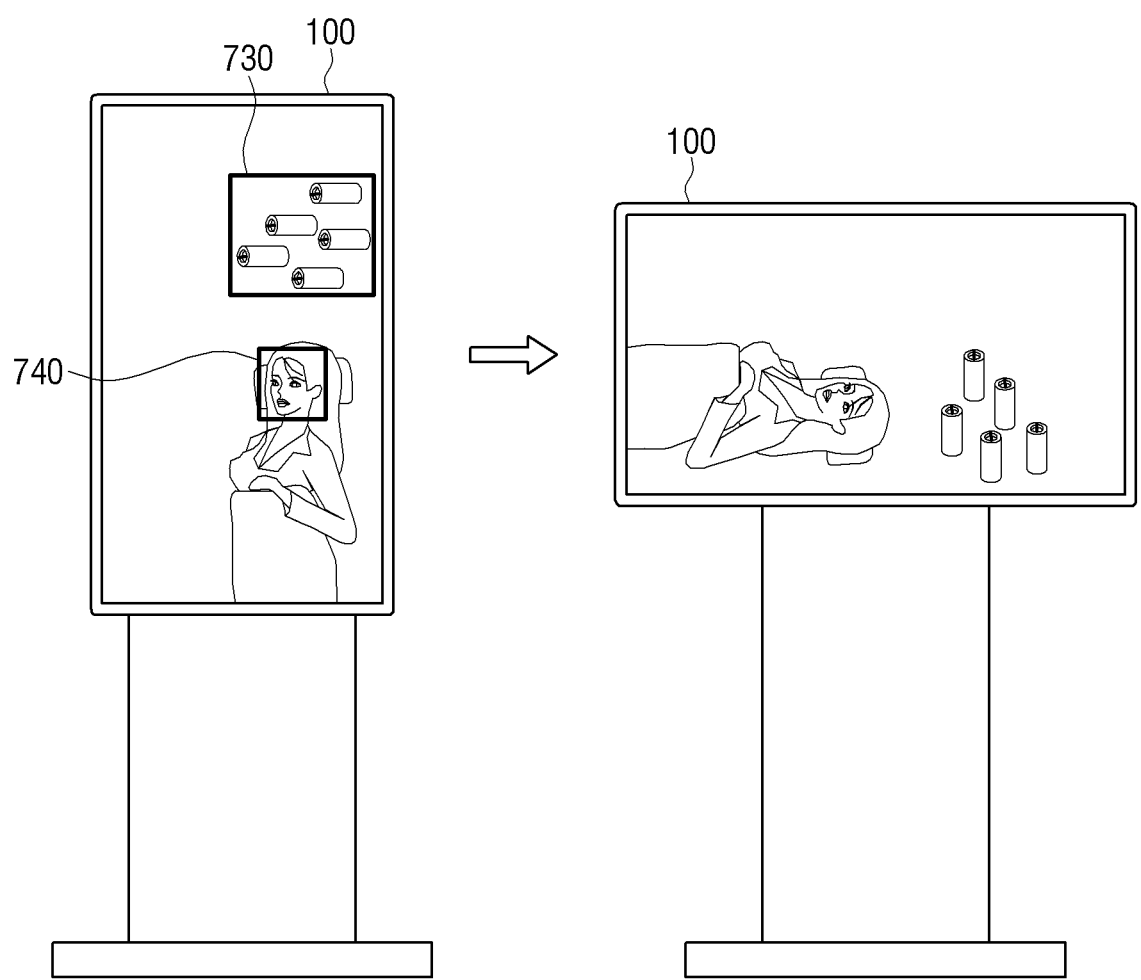
FIG. 7B is a diagram for illustrating an embodiment wherein the type of an image is determined.
Figure 8:
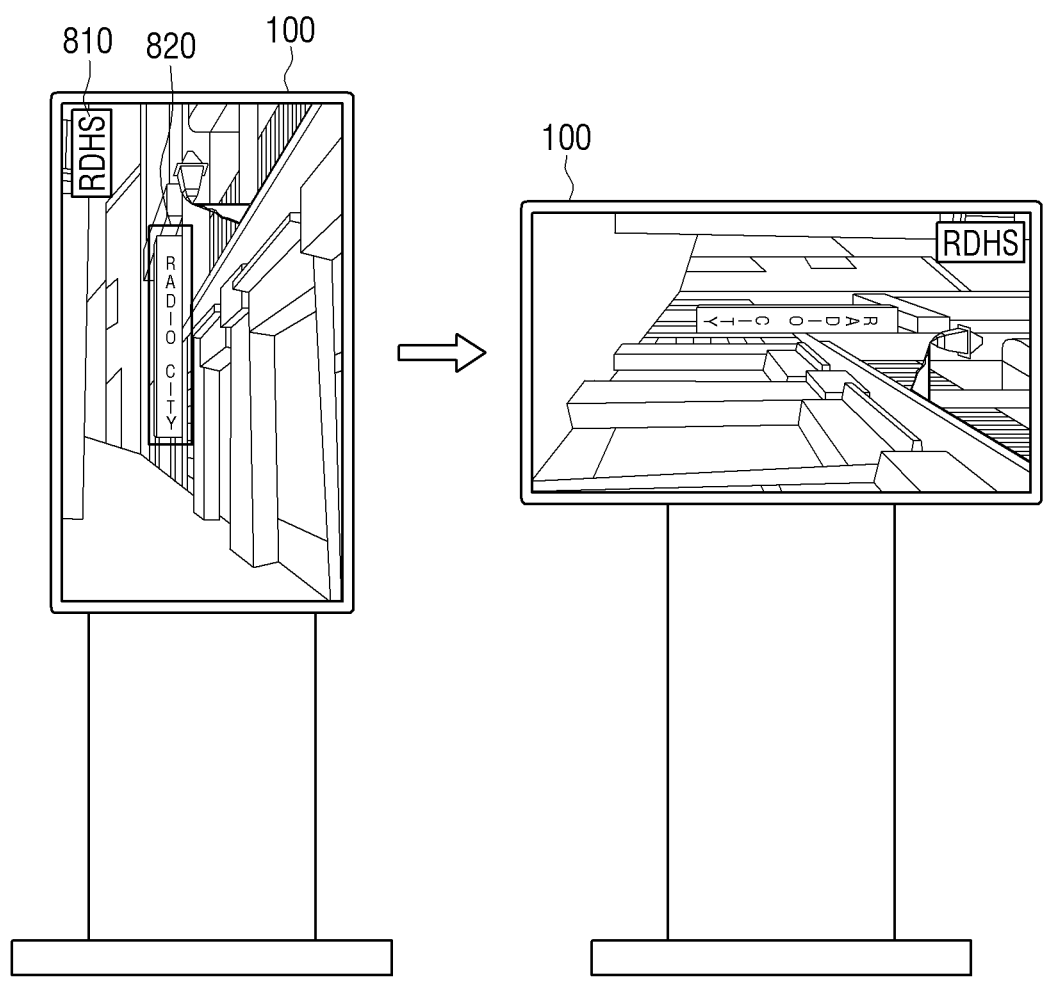
FIG. 8 is a diagram for illustrating an embodiment wherein the type of an image is determined.

FIGS. 7A, 7B and 8 are diagrams for illustrating an embodiment wherein the type of an image is determined.

Depending on cases, there may be a plurality of objects included in an image, and some of the directions of the plurality of objects may differ from each other. For example, in a case wherein a text, a person, and a thing are identified in an image, directions of some of these objects may be horizontal, while directions of other(s) of these objects may be vertical.

In this case, the processor 130 may determine the direction of the object (or the direction type of the image) based on priorities assigned or corresponding to one or more object types. For example, the processor 130 may determine the direction of the object (or the direction of the image) based on the direction of a particular object type, e.g., based on the direction of the text. Further, in case a text is not included in an image, the processor 130 may determine the direction of the object (or the direction type of the image) based on the direction of a next prioritized type of object, e.g., based on the direction of a thing.

For example, in case an image as in FIG. 7A is displayed on the display 110, the processor 130 may identify a thing 710 and a text 720 included in the image by using at least one of an image recognition algorithm or an artificial intelligence model.

Based on the identified thing 710 and/or the identified text 720, the processor 130 may determine the direction of an object. Referring to FIG. 7A, the processor 130 may determine a thing 710 as an object not rotated or an object rotated in a counterclockwise direction at an angle in a predetermined first range (e.g., 1° to 20° based on the shape of the thing 710. That is, the processor 130 may determine that the direction of the thing 710 is a horizontal direction.

Also, the processor 130 may determine a text 720 in FIG. 7A as an object rotated in a clockwise direction at an angle of 90° which is an angle in a predetermined second range based on the shape of the text 720. That is, the processor 130 may determine that the text 720 is in a vertical direction.

As described above, in case the directions of a text 720 and a thing 710 included in an image displayed on the display 110 are different from each other, the processor 130 may determine the type of the image based on the direction of the text 720. That is, in the present embodiment, the width of the image is longer (greater) than the height of the image, based on the vertical direction that is the direction of the text 720, and thus the processor 130 may determine the type of the image displayed on the display 110 as a horizontal type.

Accordingly, the processor 130 may control the driver 120 to rotate the display 110 to a horizontal direction.

As another example, in case an image as in FIG. 7B is displayed on the display 110, the processor 130 may identify a thing 730 and a face 740 of a person included in the image by using at least one of an image recognition algorithm or an artificial intelligence model.

Based on the identified thing 730 and/or the identified face 740, the processor 130 may determine the direction of an object. Referring to FIG. 7B, the processor 130 may determine the thing 730 as an object rotated in a counterclockwise direction at an angle of 90° which is an angle in a predetermined second range based on the shape of the thing 730. That is, the processor 130 may determine that the direction of the thing 730 is a vertical direction.

Also, the processor 130 may determine the face 740 of a person in FIG. 7B as an object not rotated or an object rotated in a clockwise direction at an angle in a predetermined first range (e.g., 1° to 20° based on the shape of the face 740. That is, the processor 130 may determine that the direction of the face 740 of a person is a horizontal direction.

As described above, in case the directions of a thing 730 and a face 740 included in an image displayed on the display 110 are different from each other, the processor 130 may determine the type of the image based on the direction of the thing 730. That is, in the present embodiment, the width of the image is longer (greater) than the height of the image based on a vertical direction that is the direction of the thing 730, and thus the processor 130 may identify the type of the image displayed on the display 110 as a vertical type.

Accordingly, the processor 130 may control the driver 120 to rotate the display 110 in a horizontal direction.

As described above, in case the directions of a plurality of objects included in an image are different, the processor 130 may determine the type of the image according to predetermined priorities. That is, the processor 130 may determine the type of the image based on text included in the image as the first priority, based on an object as the second priority, and based on a person (or face of a person) as the third priority. Accordingly, the processor 130 may control to rotate a display 110 to correspond to the actual type of an image. Meanwhile, the aforementioned priorities are merely an example, and it is understood that one or more other embodiments are not limited thereto. For example, according to another embodiment, priorities may be set by a user, or may vary. Further, according to another embodiment, when the directions of the thing 730 and the face 740 included in the image displayed on the display 110 are different from each other, the processor 130 may determine the type of the image based on the direction of the face 740. According to still another embodiment, if the number of identified first type of objects (e.g., faces) in a first direction is greater than a predetermined number or greater than the number of identified second type of objects (e.g., things) in a second direction, the processor 130 may determine the type of the image based on the direction of the first type of objects.

Meanwhile, depending on cases, a plurality of objects having the same priority but different directions may be included in an image. For example, as shown in FIG. 8, a first object 810 may be oriented in a vertical direction and a second object 820 may be oriented in a horizontal direction. Here, the first object 810 may be a text that is displayed in a specific area of a screen while being fixed even if the frame of an image is changed (such as the logo of a broadcasting company), and the second object 820 may be a text that is not included in a screen when the frame of an image is changed such as a text included in a moving image.

In this case, the processor 130 may determine the type of an image based on an object displayed in a specific area of a screen while being fixed even if the frame of an image is changed such as the logo of a broadcasting company. Specifically, in a case where a plurality of objects having the same priority but different directions are included in an image, the processor 130 may analyze a plurality of image frames and determine the type of the image based on the objects included in the plurality of image frames.

In the case of FIG. 8, if the first text 810 is determined as a text included in a plurality of image frames from among the first text 810 and the second text 820 (and the second text 810 is determined as being included in only some of the plurality of image frames), the processor 130 may determine the first text 810 as an object displayed in a specific area of a screen while being fixed. Then, in case the first text 810 is a text rotated in a counterclockwise direction at an angle of 90° as in FIG. 8, the processor 130 may determine the direction of the first text 810 as a vertical direction, and determine the type of the image displayed on the display 110 as a horizontal type. Accordingly, the processor 130 may control the driver 120 to rotate the display 110 in a horizontal direction.

Figure 9:
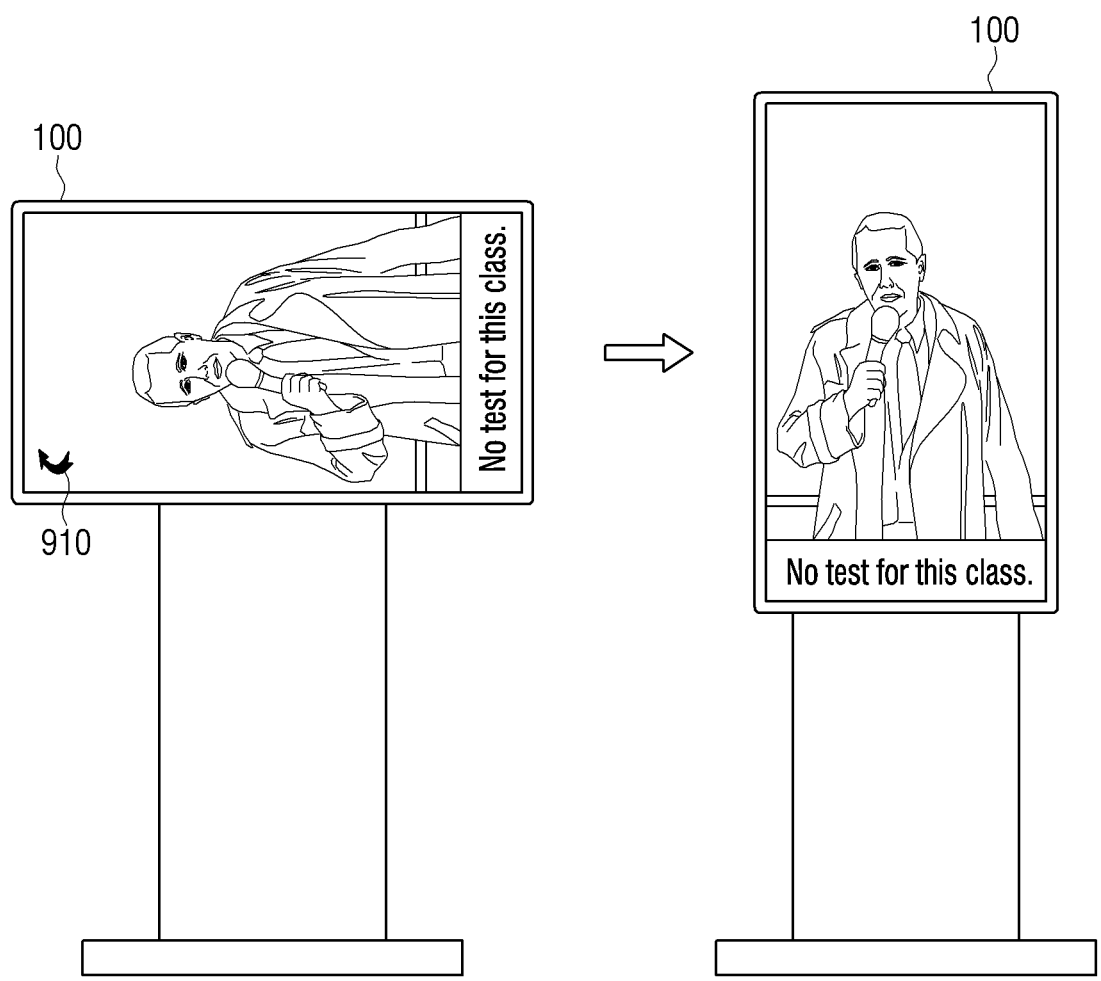
FIG. 9 is a diagram for illustrating a user interface (UI) for rotation according to an embodiment.

FIG. 9 is a diagram for illustrating a user interface (UI) for rotation according to an embodiment.

As described above, while the display 110 is arranged in a vertical direction, if it is determined that an image of a horizontal type is displayed on the display 110, the processor 130 may control the driver 120 to rotate the display 110 in a horizontal direction. Similarly, while the display 110 is arranged in a horizontal direction, if it is determined that an image of a vertical type is displayed on the display 110, the processor 130 may control the driver 120 to rotate the display 110 in a vertical direction.

Meanwhile, such an operation may not only be automatically performed in case the arrangement state of the display 110 and the type of an image do not correspond to each other, but may also be performed on the premise that a user instruction selecting a user interface (UI) or a graphical user interface (GUI) item for rotation is received.

For example, referring to FIG. 9, in case the arrangement state of the display 110 and the type of an image do not correspond to each other, the processor 130 may display a UI 910 for rotation of the display 110 in an area of the display 110. In this case, if a user instruction selecting the UI 910 is received, the processor 130 may control the driver 120 to rotate the display 110.

As described above, by displaying a UI 910 for rotation in case the arrangement state of the display 110 and the type of an image do not correspond to each other, a user may rotate the display 110 with a simple operation of selecting the UI 910.

Figure 10A:
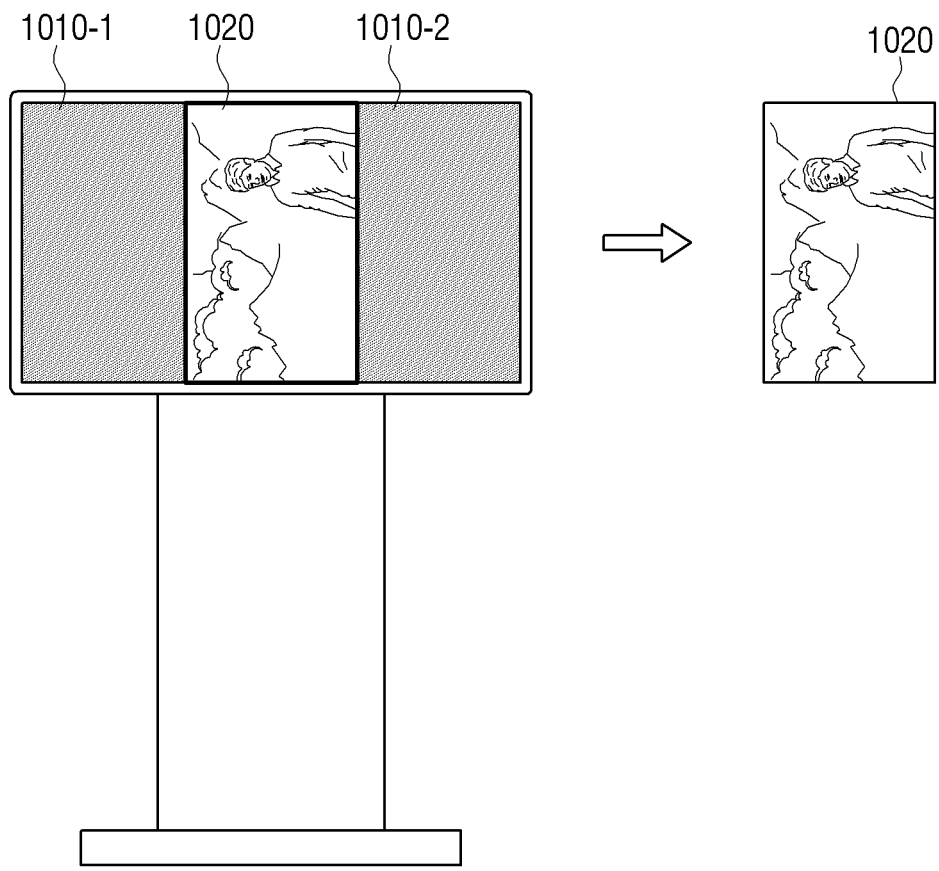
FIG. 10A is a diagram for illustrating an embodiment wherein, in case an image including a blank area is displayed on a display arranged in a horizontal direction, the remaining area excluding the blank area is cropped.
Figure 10B:
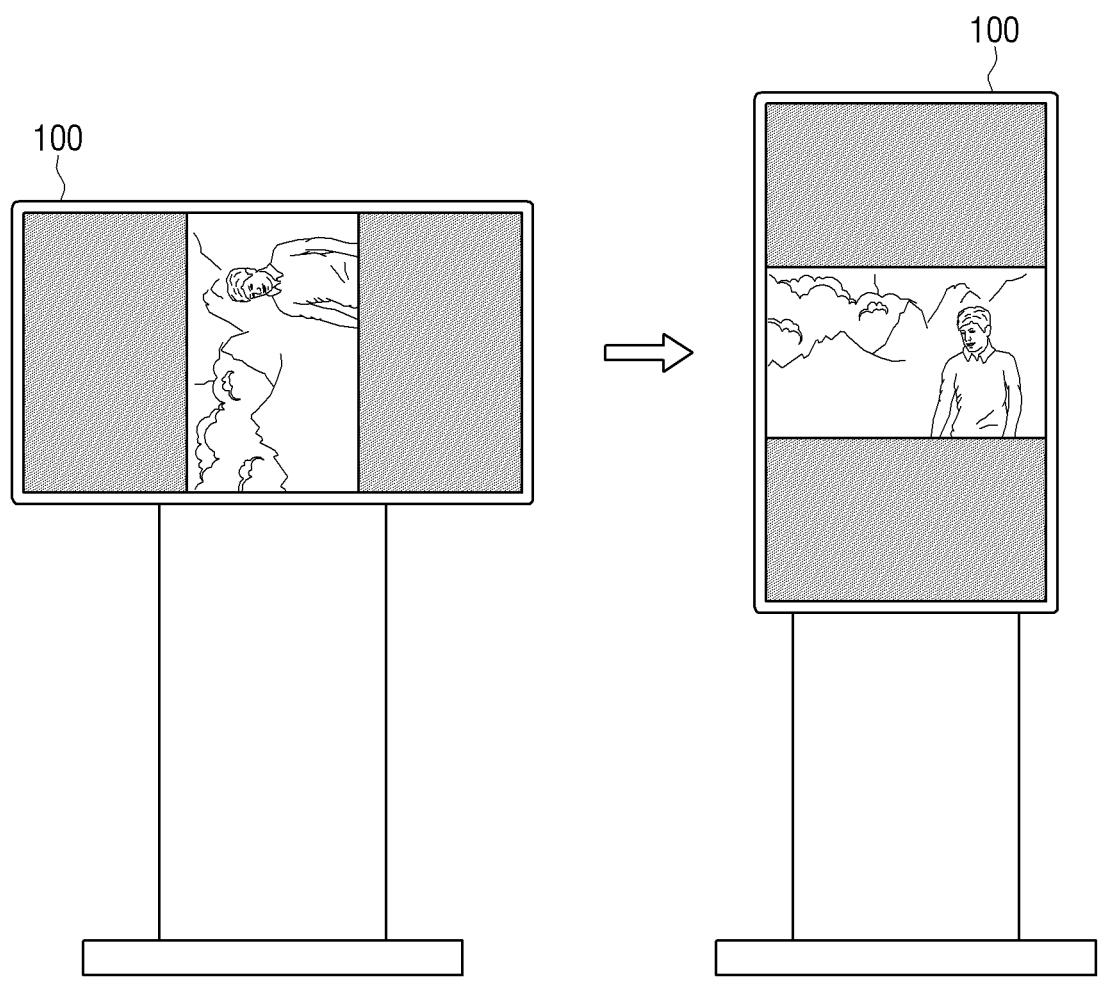
FIG. 10B is a diagram for illustrating an embodiment wherein a display displaying an image including a blank area is rotated.

FIGS. 10A and 10B are diagrams for illustrating a method for, in case an image including a blank area is displayed on a display 110 arranged in a horizontal direction, identifying an object and rotating a display 110 according to an embodiment.

Depending on cases, on the display 110, an image wherein blank areas are included in the left portion and the right portion of a content may be displayed. A case wherein a content having a resolution of 1080×1920 is reproduced while the display 110 is arranged in a horizontal direction, is shown in the left drawing in FIG. 10A.

The processor 130 may determine whether blank areas are included in an image displayed on the display 110.

Specifically, the processor 130 may determine black areas 1010-1, 1010-2 in an image displayed through the display 110, and determine areas corresponding to the black areas as blank areas. Here, the black areas 1010-1, 1010-2 may be determined by analyzing the color values of the image displayed through the display 110. However, this is merely an example, and the processor 130 may determine the blank areas 1010-1, 1010-2 included in the image displayed through the display 110 through an edge detection algorithm.

Then, the processor 130 may crop (e.g., virtually or logically crop) an image in the remaining area excluding the blank areas in the image displayed on the display 110, and identify an object in the cropped image 1020.

As described above, by identifying an object in a cropped image, but not in the entire image, the burden of operation of or load on the processor 130 may be reduced.

Also, if it is determined that an object included in the cropped image is rotated in a counterclockwise direction as in FIG. 10A, the processor 130 may determine the direction of the object as a vertical direction.

Accordingly, the processor 130 may determine the type of the entire image including blank areas based on the direction of the object. In the present embodiment, the height of the entire image including blank areas is longer (greater) than the width based on a vertical direction, and thus the image may be determined as an image of a vertical type.

The processor 130 may therefore control the driver 120 to rotate the display 110 in a clockwise direction at an angle of 90° as in FIG. 10B.

Figure 11A:
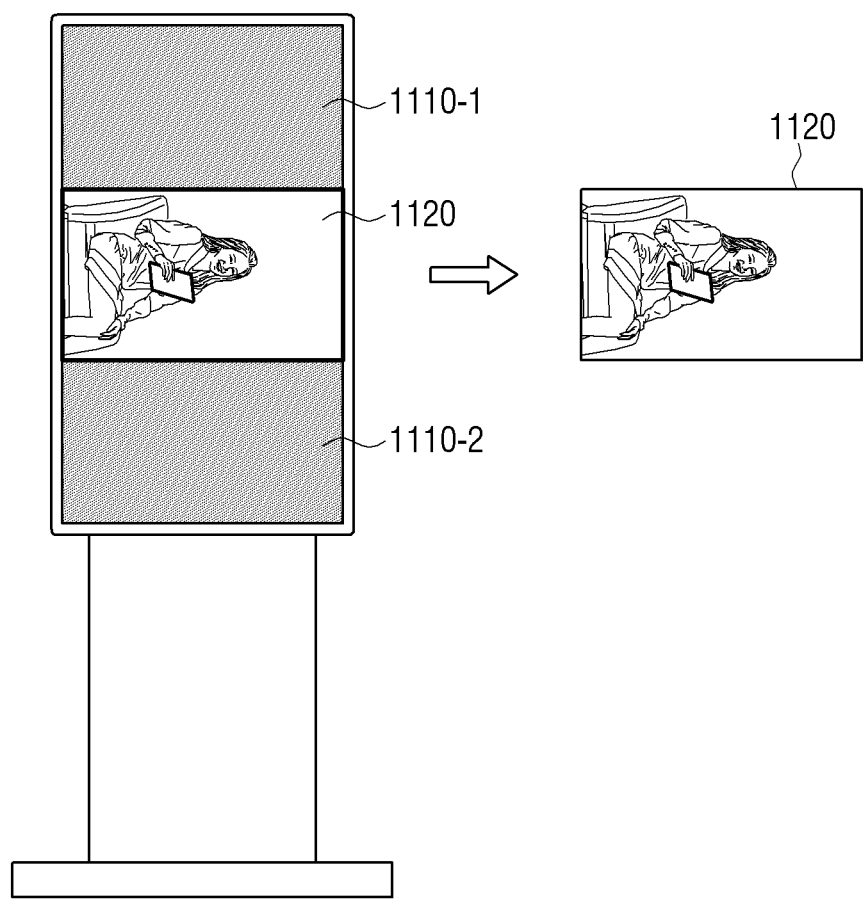
FIG. 11A is a diagram for illustrating an embodiment wherein, in case an image including a blank area is displayed on a display arranged in a vertical direction, the remaining area excluding the blank area is cropped.
Figure 11B:
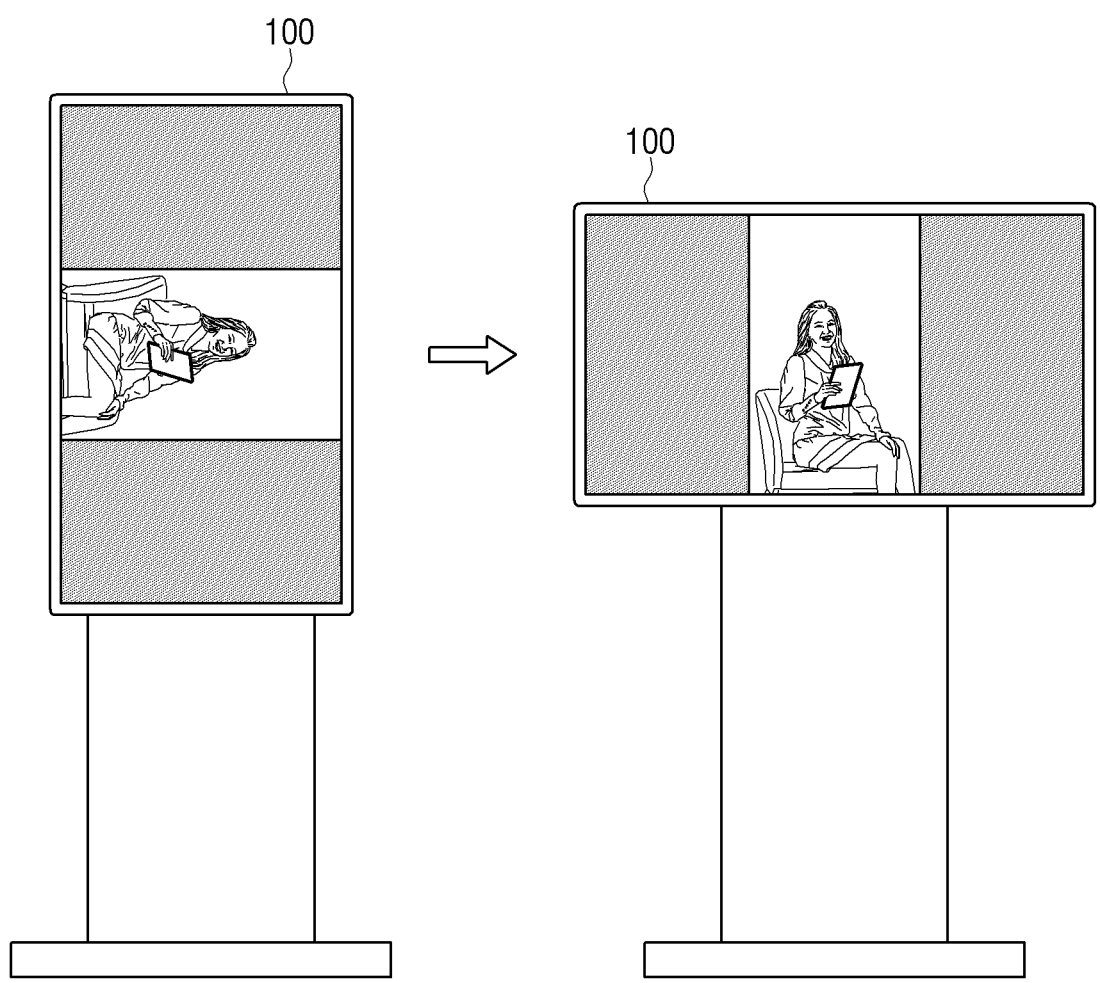
FIG. 11B is a diagram for illustrating an embodiment wherein a display displaying an image including a blank area is rotated.

FIGS. 11A and 11B are diagrams for illustrating a method for, in case an image including a blank area is displayed on a display 110 arranged in a vertical direction, identifying an object and rotating a display 110 according to an embodiment.

Depending on cases, on the display 110, an image wherein blank areas are included in the upper and lower portions of a content may be displayed. A case wherein a content having a resolution of 1920×1080 is reproduced while the display 110 is arranged in a vertical direction, is shown in the left drawing in FIG. 11A.

The processor 130 may determine whether blank areas are included in an image displayed on the display 110.

Specifically, the processor 130 may determine black areas 1110-1, 1110-2 in an image displayed through the display 110, and determine areas corresponding to the black areas 1110-1 and 1110-2 as blank areas. Here, the black areas 1110-1, 1110-2 may be determined by analyzing the color values of the image displayed through the display 110. However, this is merely an example, and the processor 130 may determine the blank areas 1110-1, 1110-2 included in the image displayed through the display 110 through an edge detection algorithm.

Then, the processor 130 may crop (e.g., vertically or logically) an image in the remaining area excluding the blank areas in the image displayed on the display 110, and identify an object in the cropped image 1120.

As described above, by identifying an object in a cropped image, but not in the entire image, the burden of operation of or load on the processor 130 may be reduced.

Also, if it is determined that an object included in the cropped image is rotated in a clockwise direction as in FIG. 11A, the processor 130 may determine the direction of the object as a vertical direction.

Accordingly, the processor 130 may determine the type of the entire image including blank areas based on the direction of the object. In present embodiment, the width of the entire image including blank areas is longer (greater) than the height based on a vertical direction, and thus the image may be determined as an image of a horizontal type.

The processor 130 may therefore control the driver 120 to rotate the display 110 in a counterclockwise direction at an angle of 90° as in FIG. 11B.

Figure 12:
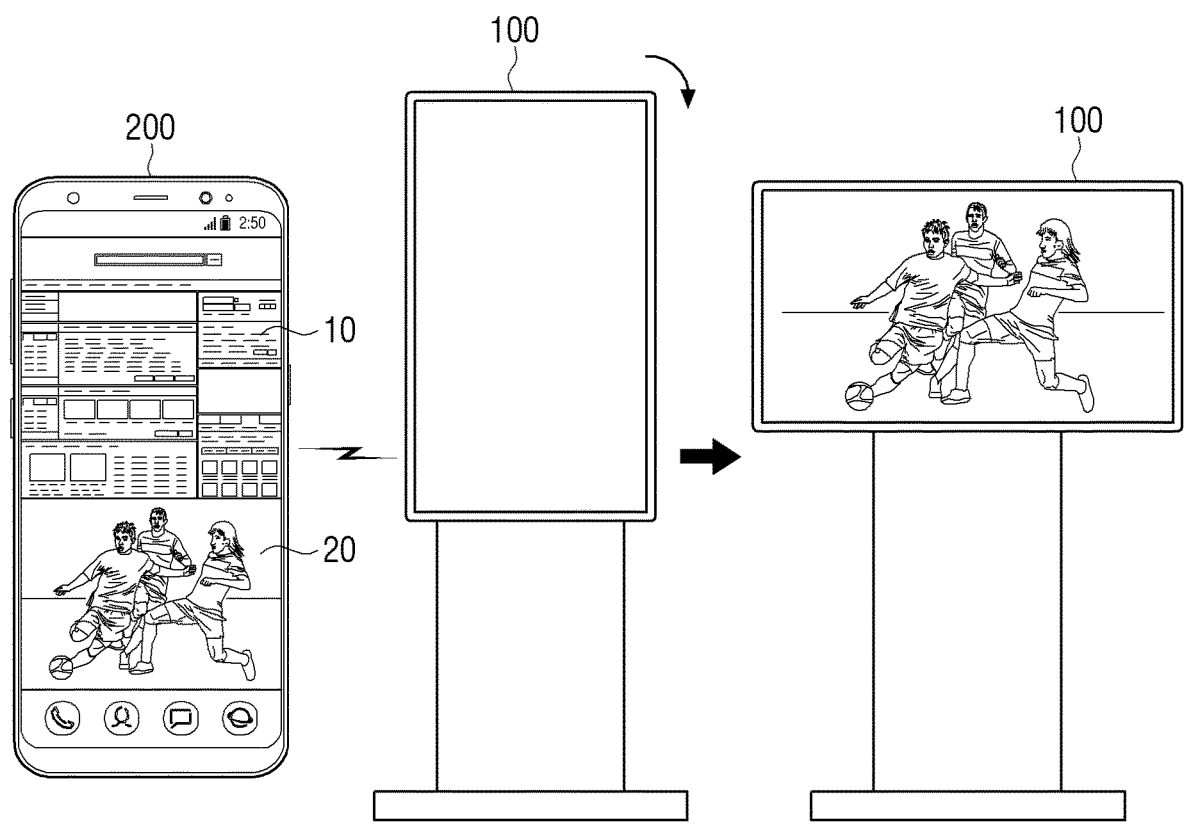
FIG. 12 is a diagram for illustrating an embodiment wherein a display apparatus displays a mirrored image.

FIG. 12 is a diagram for illustrating an embodiment wherein a display apparatus 100 displays a mirrored image according to an embodiment.

The processor 130 may display an image being displayed at an external apparatus 200 by mirroring the image. To this end, the processor 130 may perform communication with the external apparatus 200, and receive an image for mirroring from the external apparatus 200. Here, the external apparatus 200 may be a smartphone, a computer, a laptop computer, etc., but is not necessarily limited thereto. The external apparatus 200 may be various electronic apparatuses that can transmit an image being displayed at the external apparatus 200 to the display apparatus 100.

In particular, in case a moving image and a still image are included in an image received from the external apparatus 200, the processor 130 may display the moving image on the display 110. Specifically, when an image for mirroring is received from the external apparatus 200, the processor 130 may analyze a plurality of frames included in the image, and determine an area wherein a content is changed and an area wherein a content is not changed according to the change of the image frames. Then, the processor 130 may determine an area wherein a content is changed according to the change of the image frames as an area in which a moving image is included, and an area wherein a content is not changed according to the change of the image frames as an area in which a still image is included. As an example, referring to FIG. 12, the processor 130 may determine a first area 10 wherein a content is not changed according to the change of the image frames as an area in which a still image is included, and a second area 20 wherein a content is changed according to the change of the image frames as an area in which a moving is included.

The processor 130 may determine the direction of an object included in the moving image, as described above. In the case of FIG. 12, the processor 130 may determine an object included in the image as an object in a horizontal direction based on the direction of the face of a person. Accordingly, as the width of the image in the second area 20 is longer (greater) than the height based on a horizontal direction, the processor 130 may determine the image in the second area 20 as an image of a horizontal type. The processor 130 may therefore control the driver 120 to rotate the display 110 in a horizontal direction, and display, on the display 110, the image in the second area 20 displayed on the external apparatus 200 while the display 110 is in a horizontal direction.

Figure 13:
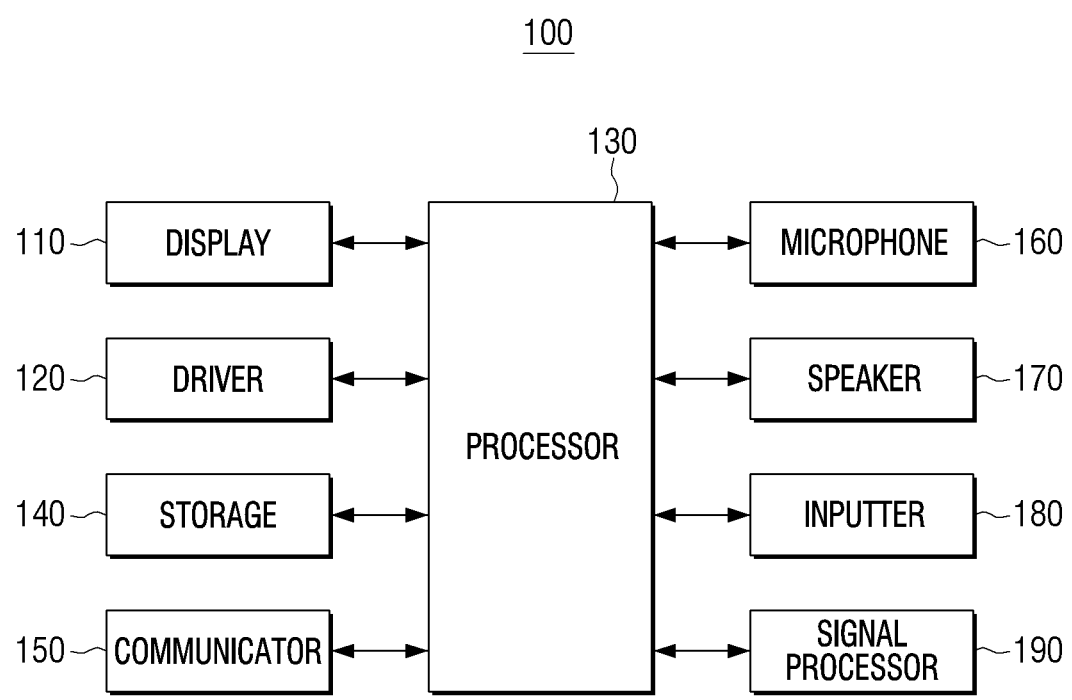
FIG. 13 is a detailed block diagram for illustrating a display apparatus according to an embodiment.

FIG. 13 is a detailed block diagram for illustrating a display apparatus 100 according to an embodiment.

Referring to FIG. 13, the display apparatus 100 according to an embodiment may include a display 110, a driver 120, a storage 140, a communicator 150, a microphone 160, a speaker 170, an inputter 180, a signal processor 190, and a processor 130. Portions that overlap or are substantially redundant with the aforementioned descriptions will be omitted below or explained briefly below.

The storage 140 may store an operating system (OS) for controlling the overall operations of the components of the display apparatus 100 and instructions or data related to the components of the display apparatus 100.

Accordingly, the processor 130 may control a plurality of hardware and/or software components of the display apparatus 100 by using various instructions, data, etc., stored in the storage 140, load instructions or data received from at least one of the other components in a volatile memory and process the loaded instructions or data, and store various data in a non-volatile memory.

In particular, the storage 140 may store information on an image recognition algorithm or an artificial intelligence model that can identify an object in an image.

The communicator 150 may communicate with an external apparatus and transmit and receive various data. For example, the communicator 150 may not only perform communication with an electronic apparatus through a near field communication network (e.g., a Local Area Network (LAN)), an Internet network, and a mobile communication network, but also perform communication with an electronic apparatus through various communication methods such as Bluetooth (BT), Bluetooth Low Energy (BLE), Wireless Fidelity (WI-FI), Zigbee, NFC, etc.

For this, the communicator 150 may include various communication modules for performing network communication. For example, the communicator 150 may include at least one of a Bluetooth chip, a Wi-Fi chip, a wireless communication chip, etc.

In particular, the communicator 150 may perform communication with an external apparatus, and receive an image from the external apparatus. For example, an external apparatus may be a server, a smartphone, a computer, a laptop computer, etc., but is not necessarily limited thereto.

Meanwhile, the communicator 150 may perform communication with an external apparatus, and receive a broadcasting content (or, a broadcasting signal). Here, a broadcasting content may include at least one of an image, audio, or additional data (e.g., electronic programming guide (EPG)). For this, the communicator 150 may include a tuner, a demodulator, an equalizer, etc.

The microphone 160 may receive a user voice. Here, a user voice may be a voice for executing a specific function of the display apparatus 100. If a user voice is received through the microphone 160, the processor 130 may analyze the user voice through a speech to text (STT) algorithm, and perform a function corresponding to the user voice.

As an example, if a user voice for rotation of the display 110 is received through the microphone 160, the processor 130 may control the driver 120 to rotate the display 110.

The speaker 170 may output various audio. For example, the speaker 170 may output audio in case the display 110 is rotated.

The inputter 180 may receive input of various user instructions. The processor 130 may execute a function corresponding to an input user instruction through the inputter 180.

For example, the inputter 180 may receive input of a user instruction for rotation of the display 110. Also, the inputter 180 may receive input of user instructions for performing turning-on, change of a channel, adjustment of a volume, etc., and the processor 130 may control to turn on the display apparatus 100, or perform change of a channel, adjustment of a volume, etc., according to an input user instruction.

For this, the inputter 180 may be implemented as an input panel. An input panel may be implemented in a touch pad type or in a key pad or a touch screen type including various function keys, number keys, special keys, character keys, etc.

The signal processor 190 performs signal processing of a content received through the communicator 150. Specifically, the signal processor 190 may perform operations such as at least on eof decoding, scaling, frame rate conversion, etc., on an image of a content, and process the image as a signal in a form that can be output at the display apparatus 100. Also, the signal processor 190 may perform signal processing such as decoding, etc., on audio of a content, and process the audio as a signal in a form that can be output at the speaker 170.

Accordingly, the display 110 may display an image, etc., output at the signal processor 190, and the speaker 170 may output audio output at the signal processor 190.

The processor 130 controls the overall operations of the display apparatus 100.

In particular, if a user instruction for displaying an image is input, the processor 130 may control the display 110 to display the image. Further, the processor 130 may identify the type of the image based on an object included in the image.

In this case, the processor 130 may identify the type of the image displayed on (or to be displayed on) the display 110 based on an object identified for a predetermined time period during which the image is displayed on the display 110 (or identified in a predetermined number of frames). For example, the predetermined time period may be 15 seconds, but the period may be set or changed variously according to a user instruction.

By identifying an object in an image based on a predetermined time period and not continuously identifying the type of the image over a long period of time, overload of the processor 130 may be avoided.

Meanwhile, an object identified for a predetermined time period may be displayed in a plurality of directions.

For example, in a music broadcasting content, an object included in an image may rotate as the actual camera angle rotates.

In case an object identified for a predetermined time period is displayed in a plurality of directions, the processor 130 may identify the type of the image based on a direction in which the object is displayed for a relatively long period of time (i.e., for the greatest period of time among the different directions).

That is, taking a case wherein a predetermined time period is 15 seconds as an example, if it is determined that the direction of an object is a horizontal direction for 10 seconds, and the direction of the object is a vertical direction for the remaining 5 seconds, the processor 130 may identify the object as an object in a horizontal direction.

Accordingly, the disclosure may identify the direction of an object precisely in a case in which the camera angle rotates or a case in which an image temporarily rotates, etc.

Meanwhile, if an object is determined to be rotated in a clockwise direction or a counterclockwise direction at an angle in a predetermined third range (e.g., 160° to 180°, the processor 130 may identify that the direction of the object is a horizontal direction.

For example, an image as in FIG. 3 or FIG. 5 may be reversed upside down. In this case, the processor 130 may control the driver 120 to rotate the display 110 at an angle of 180°.

Accordingly, a user can enjoy a natural image.

Figure 14:
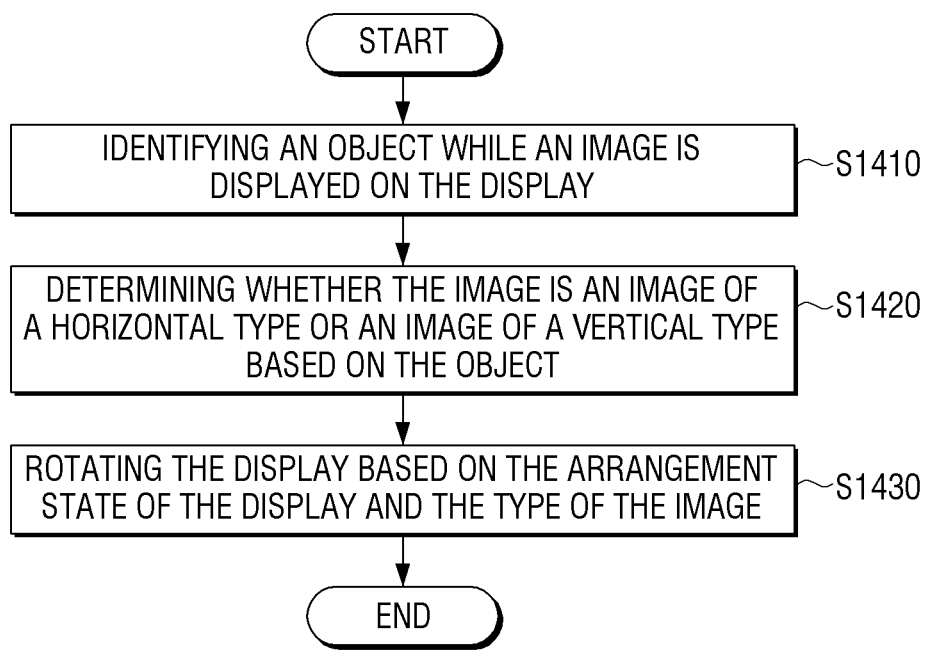
FIG. 14 is a flow chart for illustrating a control method of a display apparatus according to an embodiment.

FIG. 14 is a flow chart for illustrating a control method of a display apparatus according to an embodiment.

A display apparatus may identify an object included in an image while the image is displayed on a display (or prior to display, for example, during an image processing) at operation S1410. Specifically, a display apparatus may identify an object included in an image by using an image recognition algorithm or an artificial intelligence model.

The display apparatus may identify whether the image is an image of a horizontal type or an image of a vertical type based on the identified object at operation S1420. Specifically, in case the direction of the object is a horizontal direction, if the width of the image is longer (greater) than the height, the display apparatus may identify that the image is of a horizontal type, and if the height of the image is longer (greater) than the width, the display apparatus may identify that the image is of a vertical type. Also, in case the direction of the object is a vertical direction, if the width of the image is longer (greater) than the height, the display apparatus may identify that the image is of a horizontal type, and if the height of the image is longer (greater) than the width, the display apparatus may identify that the image is of a vertical type.

Further, the display apparatus may rotate the display based on the arrangement state of the display and the type of the image at operation S1430. Specifically, if the arrangement state of the display and the type of the image do not correspond to each other, the display apparatus may rotate the display.

Meanwhile, methods according to aforementioned embodiments may be implemented in the form of software or an application (stored on a storage medium and executable by at least one processor) that can be installed on a display apparatus with a driver 120, motor, or other mechanism for physically rotating a display.

Also, methods according to aforementioned embodiments may be implemented by software upgrade, or hardware upgrade of a display apparatus with a driver 120, motor, or other mechanism for physically rotating a display.

In addition, one or more of the aforementioned embodiments may be performed through an embedded server provided on a display apparatus, or a server outside the display apparatus.

Meanwhile, a non-transitory computer readable medium storing a program that sequentially or at least partially simultaneously performs the control method of a display apparatus according to the disclosure may be provided.

A non-transitory computer-readable medium may refer to a medium that stores data semi-permanently or permanently, and is readable by machines (e.g., processor). Specifically, the aforementioned various applications or programs may be provided while being stored in a non-transitory computer-readable medium such as a CD, a DVD, a hard disc, a blue-ray disc, a USB, a memory card, a ROM and the like.

Further, while certain embodiments have been shown and described, the disclosure is not limited to the aforementioned embodiments, and it is apparent that various modifications can be made by those having ordinary skill in the technical field to which the disclosure belongs, without departing from the spirit and scope of the disclosure as claimed at least in part by the appended claims. Also, it is intended that such modifications are not to be interpreted independently from the technical idea or prospect of the disclosure.

What is claimed is:

1. A display apparatus comprising:
a display;
a driver configured to rotate the display between a horizontal arrangement state in which a width of the display is greater than a height of the display, and a vertical arrangement state in which the height of the display is greater than the width of the display; and
a processor configured to:
identify a direction of an object included in an image, by analyzing content of the image displayed by the display,
based on the direction of the object, if a width of the image is greater than a height of the image, identify a type of the image as a horizontal type,
based on the direction of the object, if the height of the image is greater than the width of the image, identify the type of the image as a vertical type, and
based on an arrangement state of the display and the identified type of the image, control the driver to rotate the display,
wherein the object includes at least one of a text, an inanimate object or a person,
wherein the processor is further configured to:
based on a direction of the text and a direction of the inanimate object included in the image being different from each other, identify the type of the image according to the direction of the text; and
based on the direction of the inanimate object and a direction of the person included in the image being different from each other, identify the type of the image according to the direction of the inanimate object, and
wherein the processor is further configured to:
control the display to sequentially display a plurality of images, and if a plurality of objects are arranged in different directions in an image of the plurality of images, identify the type of the image based on a direction of an object among the plurality of objects, the object being fixed in a predetermined area of each of the plurality of images.

2. The display apparatus of claim 1, wherein the processor is further configured to:
based on the display being arranged in the vertical arrangement state, and based on identifying the image as the image of the horizontal type, control the driver to rotate the display to the horizontal arrangement state; and
based on the display being arranged in the horizontal arrangement state, and based on identifying the image as the image of the vertical type, control the driver to rotate the display to the vertical arrangement state.

3. The display apparatus of claim 1, wherein the processor is further configured to:
display a user interface (UI) item selectable for rotation of the display; and
based on a selection of the UI item being received, control the driver to rotate the display.

4. The display apparatus of claim 1, wherein the processor is further configured to:
determine whether a blank area is included in the image; and
based on determining that the blank area is included in the displayed image, crop the image to exclude the blank area, and identify the object in the cropped image.

5. The display apparatus of claim 1, wherein the processor is further configured to:
based on a user instruction for displaying the image being received, control to display the image on the display; and
identify whether the image is the image of the horizontal type or the image of the vertical type based on the object identified for a predetermined time period after the image is displayed on the display.

6. The display apparatus of claim 5, wherein the processor is further configured to, based on the object identified for the predetermined time period being displayed in a plurality of directions, identify a type of the image according to the direction in which the object is displayed for a relatively longest period of time.

7. The display apparatus of claim 1, wherein the processor is further configured to:
determine a direction for rotating the display by a minimum rotation angle; and control the driver to rotate the display in the determined direction.

8. A control method of a display apparatus, the control method comprising:
identifying a direction of an object included in an image by analyzing content of the image displayed by a display;
based on the direction of the object, if a width of the image is greater than a height of the image, identifying a type of the image as a horizontal type;
based on the direction of the object, if the height of the image is greater than the width, identifying the type of the image as a vertical type; and
based on an arrangement state of a display of the display apparatus and the identified type of the displayed image, rotating the display,
wherein the display is rotatable between a horizontal arrangement state in which a width of the display is greater than a height of the display, and a vertical arrangement state in which the height of the display is greater than the width of the display,
wherein the object includes at least one of a text, an inanimate object or a person,
wherein the identifying comprises:
based on a direction of the text and a direction of the inanimate object included in the image being different from each other, identifying the type of the image according to the direction of the text; and
based on the direction of the inanimate object and a direction of the person included in the image being different from each other, identifying the type of the image according to the direction of the inanimate object,
wherein the identifying further comprises:
controlling the display to sequentially display a plurality of images, and if a plurality of objects are arranged in different directions in an image of the plurality of images, identifying the type of the image based on a direction of an object among the plurality of objects, the object being fixed in a predetermined area of each of the plurality of images.

9. The control method of claim 8, wherein the rotating comprises:
based on the display being arranged in the vertical arrangement state, and based on identifying the image as the image of the horizontal type, rotating the display to the horizontal arrangement state; and
based on the display being arranged in the horizontal arrangement state, and based on identifying the image as the image of the vertical type, rotating the display to the vertical arrangement state.

10. The control method of claim 8, further comprising:
displaying a user interface (UI) item selectable for rotation of the display,
wherein the rotating comprises, based on a selection of the UI item being received, rotating the display.

11. The control method of claim 8, wherein the identifying the object comprises:
determining whether a blank area is included in the image; and
based on determining that the blank area is included in the displayed image, cropping the image to exclude the blank area, and identifying the object in the cropped image.

12. The control method of claim 8, wherein the identifying comprises:
based on a user instruction for displaying the image being received, displaying the image on the display; and
identifying whether the image is the image of the horizontal type or the image of the vertical type based on the object identified for a predetermined time period after the image is displayed on the display.

13. The control method of claim 12, wherein the identifying comprises:
based on the object identified for the predetermined time period being displayed in a plurality of directions, identifying a type of the image based on the direction in which the object is displayed for a relatively longest period of time.

14. A display apparatus comprising:
a memory storing instructions; and
a processor configured to execute the instructions to:
identify a direction of an object included in an image by analyzing content of the image displayed by a display,
based on the direction of the object, if a width of the image is greater than a height of the image, identify a type of the image as a horizontal type,
based on the direction of the object, if the height of the image is greater than the width of the image, identify the type of the image as a vertical type, and
based on an arrangement state of the display and the identified type of the image, determine to rotate a display that is rotatable between a horizontal arrangement state in which a width of the display is greater than a height of the display, and a vertical arrangement state in which the height of the display is greater than the width of the display,
wherein the object includes at least one of a text, an inanimate object or a person,
wherein the processor is further configured to:
based on a direction of the text and a direction of the inanimate object included in the image being different from each other, identify the type of the image according to the direction of the text; and
based on the direction of the inanimate object and a direction of the person included in the image being different from each other, identify the type of the image according to the direction of the inanimate object, and
wherein the processor is further configured to:
control the display to sequentially display a plurality of images, and if a plurality of objects are arranged in different directions in an image of the plurality of images, identify the type of the image based on a direction of an object among the plurality of objects, the object being fixed in a predetermined area of each of the plurality of images.

* * * * *